(12) United States Patent
Kim

(10) Patent No.: US 10,940,882 B2
(45) Date of Patent: Mar. 9, 2021

(54) STEERING CONTROL APPARATUS, STEERING APPARATUS AND STEERING METHOD FOR VEHICLE BASED ON STEER-BY-WIRE

(71) Applicant: MANDO CORPORATION, Gyeonggi-do (KR)

(72) Inventor: Jung-Yeol Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 207 days.

(21) Appl. No.: 16/172,701

(22) Filed: Oct. 26, 2018

(65) Prior Publication Data

US 2019/0126971 A1 May 2, 2019

(30) Foreign Application Priority Data

Oct. 27, 2017 (KR) .................. 10-2017-0141550

(51) Int. Cl.
| | |
|---|---|
| *B62D 5/00* | (2006.01) |
| *B62D 15/02* | (2006.01) |
| *B62D 5/04* | (2006.01) |
| *B62D 6/00* | (2006.01) |

(52) U.S. Cl.
CPC .......... *B62D 5/006* (2013.01); *B62D 5/0463* (2013.01); *B62D 6/008* (2013.01); *B62D 15/0215* (2013.01)

(58) Field of Classification Search
CPC ...... B62D 5/006; B62D 5/0463; B62D 6/008; B62D 15/0215
See application file for complete search history.

(56) References Cited

U.S. PATENT DOCUMENTS

2012/0259515 A1* 10/2012 Freienstein ......... B60R 21/0132
701/46
2019/0144030 A1* 5/2019 Sakai .................. B62D 5/0403
318/3

\* cited by examiner

*Primary Examiner* — Nga X Nguyen
(74) *Attorney, Agent, or Firm* — Ladas & Parry, LLP

(57) ABSTRACT

Some embodiments relate to a steer-by-wire-based vehicle steering control apparatus, vehicle steering apparatus, and vehicle steering method. The steer-by-wire-based vehicle steering control apparatus may include: a vehicle state information acquisition unit configured to acquire information associated with a state of operating a steering rack module, which is connected to a wheel and is mechanically separated from a steering column module connected to a steering wheel; and a steering reaction force control unit configured to determine a state of collision or contact with an external object based on the information associated with the state of operating the steering rack module and to control an operation of a steering reaction force motor, which is included in the steering column module and provides a steering reaction force to the steering wheel, according to the determination result.

15 Claims, 22 Drawing Sheets

STEERING CONTROL APPARATUS, STEERING APPARATUS AND STEERING METHOD FOR VEHICLE BASED ON STEER-BY-WIRE

CROSS REFERENCE TO RELATED APPLICATION

This application claims priority to Korean Patent Application No. 10-2017-0141550, filed on Oct. 27, 2017, which is hereby incorporated by reference for all purposes as if fully set forth herein.

BACKGROUND

1. Technical Field

Various exemplary embodiments of the present disclosure relate to a steering system, and more particularly, to a steer-by-wire-based vehicle steering control apparatus, a vehicle steering apparatus, and a vehicle steering method.

2. Description of the Related Art

Generally, a steering system may refer to a system in which a driver of a vehicle can change the steering angle of vehicle wheels by applying steering force (or torque) to a steering wheel. In recent years, an electric power steering system, such as the Electric Power Steering (EPS), has been applied to a vehicle in order to reduce the steering force of the steering wheel to ensure consistent steering conditions.

This electric power steering system may measure a speed state and a torque state of a vehicle through a vehicle speed sensor and a torque sensor mounted on the vehicle, and drives a motor through an Electronic Control Unit (ECU) according to the measured speed state and torque state of the vehicle to provide a driver with a light and comfortable steering feeling at the time of low-speed operation, to provide the driver with heavy and safe steering feeling at the time of high-speed operation, and for the driver to perform rapid steering in the event of an emergency, thereby providing optimum steering conditions.

In recent years, studies have been actively conducted on a steer-by-wire-based vehicle steering apparatus. Such a steer-by-wire-based vehicle steering apparatus may include a steering column module connected to a steering wheel and a steering rack module connected to at least one vehicle wheel, which are mechanically separated from each other.

Accordingly, in the conventional steer-by-wire-based vehicle steering apparatus, since the steering column module and the steering rack module are mechanically separated from each other as described above, there is a problem that a driver cannot perceive, in the event of collision with an external object (e.g., a collision between a vehicle wheel and a curb, or the like), the state of the collision with the external object (e.g., the state in which a wheel ascends a curb).

In addition, in the conventional steer-by-wire-based vehicle steering apparatus, since the steering column module and the steering rack module are mechanically separated from each other, there is a problem in that, when collision with an external object is severe (e.g., the collision between the vehicle wheel and the curb, or the like), the steering wheel continues to move, that is, rotates without stopping.

It is with respect to these and other general considerations that the following embodiments have been described. Also, although relatively specific problems have been discussed, it should be understood that the embodiments should not be limited to solving the specific problems identified in the background.

SUMMARY

According to some embodiments of the present disclosure, a steer-by-wire-based vehicle steering control apparatus may control the operation of a steering reaction force motor to allow a driver to accurately perceive the state of collision or contact with an external object (e.g., collision between a vehicle wheel and a curb, or the like).

According to certain embodiments of the present disclosure, a steer-by-wire-based vehicle steering method may control the operation of a steering reaction force motor to allow a driver to accurately perceive the state of collision or contact with an external object (e.g., collision between a vehicle wheel and a curb, or the like).

According to some embodiments of the present disclosure, a steer-by-wire-based vehicle steering apparatus may control the operation of a steering reaction force motor to allow a driver to accurately perceive the state of collision or contact with an external object (e.g., collision between a vehicle wheel and a curb, or the like).

In accordance with an aspect of the present disclosure, there is provided a steer-by-wire-based vehicle steering control apparatus, including: a vehicle state information acquisition unit, configured to acquire operating state information on a steering rack module which is connected to a wheel and is mechanically separated from a steering column module connected to a steering wheel; and a steering reaction force control unit, configured to determine the state of a collision with an external object based on the operating state information on the steering rack module and to control the operation of a steering reaction force motor, which is included in the steering column module and provides a steering reaction force to the steering wheel, according to the determination result.

In accordance with another aspect of the present disclosure, there is provided a steer-by-wire-based vehicle steering method, including: acquiring operating state information on a steering rack module which is connected to a wheel and is mechanically separated from a steering column module connected to a steering wheel; determining a state of a collision with an external object based on the operating state information on the steering rack module; and controlling an operation of a steering reaction force motor, which is included in the steering column module and provides a steering reaction force to the steering wheel, according to the determination result.

In accordance with still another aspect of the present disclosure, there is provided a steer-by-wire-based vehicle steering apparatus, including: a steering column module configured to be connected to a steering wheel; a steering rack module configured to be connected to a wheel and is mechanically separated from the steering column module; and a control module configured to acquire operating state information on the steering rack module, to determine the state of a collision with an external object based on the operating state information on the steering rack module, and to control the operation of a steering reaction force motor, which is included in the steering column module and provides a steering reaction force to the steering wheel, according to the determination result.

According to some embodiment of the present disclosure, an apparatus for controlling a steer-by-wire-based vehicle may comprise: one or more processors; and memory storing executable instructions that, if executed by the one or more processors, configure the one or more processors to: acquire information associated with a state of operating a steering rack module, wherein the steering rack module is connected to at least one vehicle wheel and is mechanically separated from a steering column module connected to a steering wheel; and determine a state of collision or contact of the at least one vehicle wheel with an external object based on the information associated with the state of operating the steering rack module and control a steering reaction force motor, comprised in the steering column module and providing steering reaction force to the steering wheel, according to the determined state of the collision or contact.

According to certain embodiments of the present disclosure, a method for controlling a steer-by-wire-based vehicle may comprise: acquiring information associated with a state of operating a steering rack module, wherein the steering rack module is connected to at least one vehicle wheel and is mechanically separated from a steering column module connected to a steering wheel; determining a state of collision or contact of the at least one vehicle wheel with an external object based on the information associated with the status of operating the steering rack module; and controlling a steering reaction force motor, comprised in the steering column module and providing a steering reaction force to the steering wheel, according to the determined state of the collision or contact.

According to some embodiments of the present disclosure, an apparatus may comprise: a steering column module connected to a steering wheel; a steering rack module connected to at least one vehicle wheel and mechanically separated from the steering column module; and a controller configured to acquire information associated with a status of operating the steering rack module, to determine a state of collision or contact of the at least one vehicle wheel with an external object based on the information associated with the status of operating the steering rack module, and to control a steering reaction force motor, comprised in the steering column module and providing steering reaction force to the steering wheel, according to the determined status of the collision or contact.

As described above, according to some exemplary embodiments of the steer-by-wire-based vehicle steering control apparatus, vehicle steering apparatus, and vehicle steering method, it is possible for a driver to more accurately perceive the state of collision with an external object (e.g., collision between a vehicle wheel and a curb, or the like) through a haptic response generated on a steering wheel.

In addition, according to certain embodiments of the present disclosure, it is possible for a driver to more accurately perceive the state of collision or contact with an external object (e.g., collision between a vehicle wheel and a curb, or the like) through locking of a steering wheel.

Further, according to some embodiments of the present disclosure, it is possible to use control information (position information of a rack, driving current information of a driving motor, steering angle information and angle information of a pinion, etc.) of a steering reaction force motor unchanged without additional device installation, thereby reducing costs.

Further, according to certain embodiments of the present disclosure, it is possible to use another sensor signal when one sensor signal fails, thereby satisfying reliability requirements as well as redundancy for steering control.

Further, according to some embodiments of the present disclosure, it is possible to generate a haptic response on a steering wheel through a dithered or modulated current in response to a state of collision or contact with an external object (e.g., collision between a vehicle wheel and a curb, or the like), thereby allowing a driver to more accurately recognize (or perceive) the state of the collision with the external object (e.g., the collision between the vehicle wheel and the curb, or the like).

Further, according to certain embodiments of the present disclosure, it is possible to lock a steering wheel through the maximum current of a steering reaction force motor, thereby allowing a driver to more accurately perceive the state of collision or contact with an external object (e.g., collision between a vehicle wheel and a curb, or the like).

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
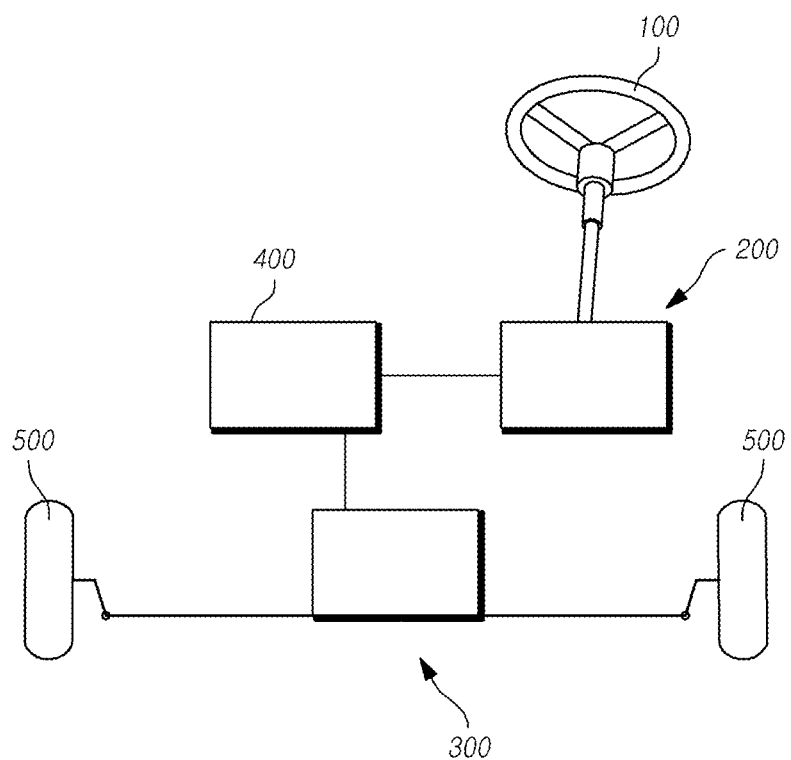
FIG. 1 shows an overall configuration diagram of a steer-by-wire-based vehicle steering apparatus according to an embodiment of the present disclosure.

The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements. The expression "and/or" includes any or all combinations of items enumerated together.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Unless defined otherwise, all terms as used herein (including technical terms and scientific terms) have the same meaning as commonly understood by a person of ordinary skill in the art to which the present disclosure pertains. Such terms as those defined in a generally used dictionary are not to be interpreted to have ideal or excessively meanings unless clearly defined in the present disclosure.

In the following description of the embodiments of the present disclosure, a detailed description of known functions and configurations incorporated herein will be omitted when it may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

Hereinafter, a steer-by-wire-based vehicle steering apparatus according to the present embodiments will be described with reference to the accompanying drawings.

FIG. 1 illustrates an overall configuration diagram of a steer-by-wire-based vehicle steering apparatus according to exemplary embodiments of the present disclosure.

Referring to FIG. 1, the steer-by-wire-based vehicle steering apparatus according to the present embodiments may generally include a steering wheel 100, a steering column module (SCM) 200, a steering rack module (SRM) 300, a control module 400, at least one vehicle wheel 500, and the like.

The steering wheel 100 may be operated (that is, rotated) by the operation of a driver. The steering wheel 100 may be rotated by the operation of the driver and, based on this, may determine or change an advancing or turning direction of a vehicle (e.g., advancing direction of at least one vehicle wheel 500 or the like).

The steering column module 200 may be connected to the steering wheel 100. For example, the steering column module 200 may generally include one or more of a steering shaft, a steering reaction force motor, sensors, and the like.

The steering shaft may be connected to the steering wheel 100. Further, the steering shaft may rotate in a manner or direction corresponding to the rotation of the steering wheel 100 when the steering wheel 100 rotates.

The steering reaction force motor may be connected to the steering shaft. In addition, the steering reaction force motor may rotate in a direction opposite the rotation direction of the steering wheel 100 so as to provide a steering reaction force to the steering wheel 100. Such a steering reaction force motor may provide the driver with an appropriate steering sensation or feeling.

The steering reaction force motor may be directly connected to the steering shaft, but may be indirectly connected to the steering shaft. For example, the steering reaction force motor may be connected to the steering shaft via a gear (or a speed reducer), without being limited thereto. Here, the gear (or the speed reducer) may be of a worm-wheel type, but is not limited thereto. The gear may be of any type that capable of connecting the steering reaction force motor to the steering shaft.

The sensors may measure the status of various components included in the steering column module 200. Further, the sensors may include at least one of a steering angle sensor, a steering torque sensor, and a steering angular velocity sensor, but are not limited thereto. The sensors may include any kind of sensor that can measure the status of one or more components included in the steering column module 200.

Here, the steering angle sensor may measure the rotation angle of the steering wheel 100, for example, but not limited to, the steering angle of the steering wheel 100. The steering torque sensor may measure a steering torque generated on the steering shaft when the steering wheel 100 rotates. The steering angular velocity sensor may measure the rotational angular velocity of the steering wheel 100, for example, but not limited to, the steering angular velocity of the steering wheel 100.

The steering rack module 300 may be mechanically separated from the steering column module 200 described above. The steering column module 200 may generally include, for example, but not limited to, a driving motor, a pinion, a rack, respective sensors, and the like.

The driving motor may be driven by a driving current. Further, the driving motor may generate driving torque corresponding to the driving current. Further, the driving motor may provide steering force to the wheel 500 based on the generated driving torque.

The pinion may be connected to the driving motor. Also, the pinion may perform rotational motion based on the driving torque generated in the driving motor. The rack may be connected to the pinion. In addition, the rack may perform linear motion based on the rotational motion of the pinion. In this manner, the pinion and the rack may change the direction of at least one vehicle wheel 500 by providing the steering force to at least one vehicle wheel 500 based on the driving torque of the above-described driving motor.

The respective sensors may measure the status of various components included in the steering rack module 300. Further, the sensors may include at least one of a rack position sensor, a rack displacement sensor, a pinion angle sensor, and a pinion angular velocity sensor, but are not limited thereto. The sensors may include any kind of sensor that can measure the status of the various components included in the steering rack module 300.

For example, the rack position sensor may measure the position of the rack. The rack displacement sensor may measure the displacement of the rack. The pinion angle sensor may measure the rotation angle of the pinion, that is, the angle of the pinion. The pinion angular velocity sensor may measure the rotational angular velocity of the pinion, that is, the angular velocity of the pinion.

The control module 400 may be connected to the above-described steering column module 200 and steering rack module 300. The control module 400 may control the operation of the steering column module 200 and the steering rack module 300, that is, the operation of the respective components included in the steering column module 200 and the steering rack module 300.

For example, the control module 400 may receive each piece of information from each component included in the steering column module 200 and the steering rack module 300, may generate a control signal using the received information, and may control the operation of each component included in the steering column module 200 and the steering rack module 300 based on the generated control signal.

In addition, the control module 400 may be connected to the sensors disposed in the vehicle. In addition, the control module 400 may control the operation of the respective sensors disposed in the vehicle. For instance, the control module 400 may control the operation of the respective sensors disposed in the vehicle and may receive each piece of sensor information (e.g., vehicle speed information of the vehicle, etc.) from the sensors. In addition, the control module 400 may generate each control signal based on each received piece of sensor information, and may control the operation of the components included in the steering column module 200 and the steering rack module 300 using each generated control signal.

At least one vehicle wheel 500 may be connected to the steering rack module 300. For example, the wheel 500 may be connected to the rack. Specifically, the wheel 500 may be connected to the rack via a tie rod and a knuckle arm. Thus, the linear motion of the rack may be transmitted to the vehicle wheel 500 through the tie rod and the knuckle arm.

Continuously referring to FIG. 1, the steer-by-wire-based vehicle steering apparatus according to some embodiments of the present disclosure may acquire information on or associated with the state of operating the steering column module, which may be connected to the steering wheel, and information on or associated with the state of operating the steering rack module, which may be connected to at least one vehicle wheel and be mechanically separated from the steering column module, may determine the state of collision with an external object based on the information on or associated with the state of operating the steering rack module, and may control the operation of a steering reaction force motor, which may be included in the steering column module and provides steering reaction force to the steering wheel, based on the determination result.

The control module 400 may determine whether at least one vehicle wheel ascends a curb based on the position information of the rack, comprised in the operating state information on or associated with the steering rack module.

The control module 400 may determine whether at least one vehicle wheel ascends the curb based on the driving current information of the driving motor, included in the operating state information on or associated with the steering rack module.

The control module 400 may acquire the operating state information on the steering column module, and may determine whether at least one vehicle wheel ascends the curb based on each piece of information among steering angle information, included in the operating state information on or associated with the steering column module, and angle information of a pinion, comprised in the operating state information on the steering rack module.

The control module 400 may acquire the operating state information on the steering column module, and may determine whether at least one vehicle wheel ascends the curb based on steering angle information, comprised in the operating state information on or associated with the steering column module, and motor angle information of the driving motor, included in the operating state information on or associated with the steering rack module.

The control module 400 may acquire the operating state information on or associated with the steering column module, may inspect steering angle sensor signal information, included in the operating state information on or associated with the steering column module, and pinion angle sensor signal information and rack position sensor signal information, comprised in the operating state information on or associated with the steering rack module, and may determine whether at least one vehicle wheel ascends the curb based on the position information of the rack, the steering angle information, or each piece of information of the pinion according to the inspection result.

The control module 400 may acquire the operating state information on or associated with the steering column module, may determine whether at least one vehicle wheel ascends the curb based on at least one piece of information of the operating state information on or associated with the steering rack module and the operating state information on or associated with the steering column module, and may control the operation of the steering reaction force motor when at least one vehicle wheel ascends the curb, so that at least one of the generation of a haptic response on the steering wheel and the locking of the steering wheel may be performed.

The control module 400 may generate a dithered reference current of the steering reaction force motor by dithering a reference current of the steering reaction force motor, and may control the operation of the steering reaction force motor by providing the dithered reference current of the steering reaction force motor to the steering reaction force motor for a predetermined time based on the time point at which it is determined that at least one vehicle wheel ascends the curb, so that a haptic response is generated on the steering wheel.

The control module 400 may generate a modulated reference current of the steering reaction force motor by modulating a reference current of the steering reaction force motor, and may control the operation of the steering reaction force motor by providing the modulated reference current of the steering reaction force motor to the steering reaction force motor for a predetermined time based on the time point at which it is determined that at least one vehicle wheel ascends the curb so that a haptic response is generated on the steering wheel.

The control module 400 may control the operation of the steering reaction force motor by providing a maximum current of the steering reaction force motor to the steering reaction force motor for a predetermined time while increasing the reference current of the steering reaction force motor by the maximum current of the steering reaction force motor from the time point at which it is determined that at least one vehicle wheel ascends the curb, so that the steering wheel may be locked.

The control module 400 may inspect steering torque sensor signal information in the operating state information on or associated with the steering column module, may estimate steering torque based on the steering angle information, comprised in the operating state information on or associated with the steering column module, and motor angle information of the steering reaction force motor when the steering torque sensor signal information is abnormal, and may control the operation of the steering reaction force motor so that at least one of the generation of a haptic response on the steering wheel and the locking of the steering wheel may be performed.

Here, the steering reaction force motor may be directly connected to the steering shaft, or may be indirectly connected to the steering shaft via a gear.

Meanwhile, since the above-described control module 400 can be understood to be the same component as that of the vehicle steering control apparatus to be described below with reference to FIG. 2, a detailed description will be made with reference to FIG. 2.

Hereinafter, a steer-by-wire-based vehicle steering control apparatus according to various embodiments of the present disclosure will be described with reference to the accompanying drawings.

The steer-by-wire-based vehicle steering control apparatus according to some embodiments of the present disclosure may include: a vehicle state information acquisition unit configured to acquire information on or associated with the state of operating a steering rack module, connected to a wheel and mechanically separated from a steering column module connected to a steering wheel; and a steering reaction force control unit configured to determine the state of collision or contact with an external object based on the information on or associated with the state of operating the steering rack module and to control the operation of a steering reaction force motor, which is included in the steering column module and provides steering reaction force to the steering wheel, according to the determination result.

The steering reaction force control unit may determine whether at least one vehicle wheel ascends a curb, based on position information of a rack in the operating state information on or associated with the steering rack module.

The steering reaction force control unit may determine whether at least one vehicle wheel ascends a curb, based on driving current information of a driving motor in the operating state information on the steering rack module.

The vehicle state information acquisition unit may be configured to acquire operating state information on or associated with the steering column module, and the steering reaction force control unit may be configured to determine whether at least one vehicle wheel ascends the curb, based on steering angle information, comprised in the operating state information on or associated with the steering column module, and angle information of a pinion, included in the operating state information on or associated with the steering rack module.

The vehicle state information acquisition unit may be configured to acquire the operating state information on or associated with the steering column module, and the steering reaction force control unit may be configured to determine whether at least one vehicle wheel ascends the curb, based on the steering angle information, included in the operating state information on or associated with the steering column module, and motor angle information of the driving motor, comprised in the operating state information on or associated with the steering rack module.

The vehicle state information acquisition unit may be configured to acquire the operating state information on or associated with the steering column module. In addition, the steering reaction force control unit may inspect steering angle sensor signal information, included in the operating state information on or associated with the steering column module, and pinion angle sensor signal information and rack position sensor signal information, comprised in the operating state information on or associated with the steering rack module, and may determine whether at least one vehicle wheel ascends the curb based on the position information of the rack or the steering angle information and the angle information of the pinion according to the inspection result.

The vehicle state information acquisition unit may acquire the operating state information on or associated with the steering column module. In addition, the steering reaction force control unit may determine whether at least one vehicle wheel ascends the curb based on at least one piece of information of the operating state information on or associated with the steering rack module and the operating state information on or associated with the steering column module, and may control, when at least one vehicle wheel ascends the curb, the operation of the steering reaction force motor so that at least one of generation of a haptic response on the steering wheel and locking of the steering wheel may be performed.

The steering reaction force control unit may generate a dithered reference current of the steering reaction force motor by dithering a reference current of the steering reaction force motor, and may control the operation of the steering reaction force motor by providing the dithered reference current of the steering reaction force motor to the steering reaction force motor for a predetermined time based on the time point at which it is determined that at least one vehicle wheel ascends the curb, so that a haptic response may be generated on the steering wheel.

The steering reaction force control unit may generate a modulated reference current of the steering reaction force motor by modulating a reference current of the steering reaction force motor, and may control the operation of the steering reaction force motor by providing the modulated reference current of the steering reaction force motor to the steering reaction force motor for a predetermined time based on the time point at which it is determined that at least one vehicle wheel ascends the curb so that a haptic response may be generated on the steering wheel.

The steering reaction force control unit may control the operation of the steering reaction force motor by providing the maximum current of the steering reaction force motor to the steering reaction force motor for a predetermined time while increasing the reference current of the steering reaction force motor by the maximum current of the steering reaction force motor from the time point at which it is determined that the wheel ascends the curb, so that the steering wheel may be locked.

The steering reaction force control unit may inspect steering torque sensor signal information in the operating state information on or associated with the steering column module, may estimate steering torque based on the steering angle information in the operating state information on or associated with the steering column module and the motor angle information of the steering reaction force motor when the steering torque sensor signal information is abnormal, and may control the operation of the steering reaction force motor so that at least one of the generation of a haptic response on the steering wheel and the locking of the steering wheel may be performed based on the estimated steering torque.

Figure 2:
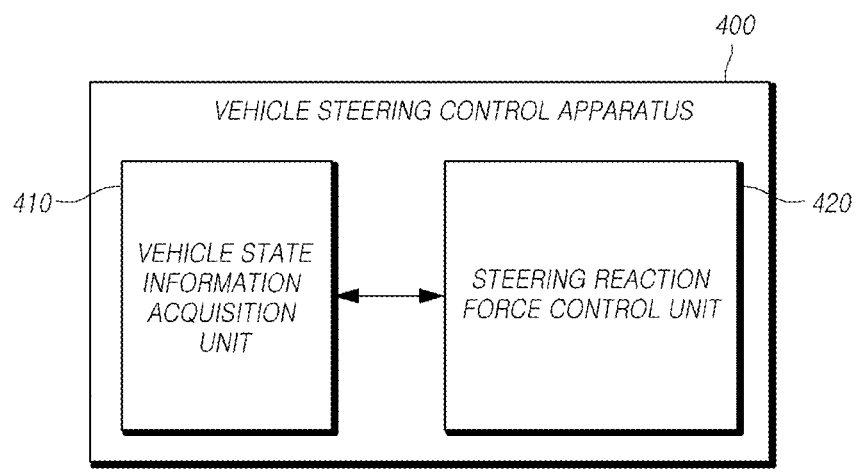
FIG. 2 shows a block diagram of a steer-by-wire-based vehicle steering control apparatus according to an embodiment of the present disclosure.

FIG. 2 illustrates a block diagram of a steer-by-wire-based vehicle steering control apparatus according to an exemplary embodiment of the present disclosure.

Referring to FIG. 2, the steer-by-wire-based vehicle steering control apparatus 400 according to the present embodiment may include a vehicle state information acquisition unit 410, a steering reaction force control unit 420, and the like.

For example, the vehicle steering control apparatus 400 may include an Electronic Control Unit (ECU) or an Electronic Stability Control (ESC), but is not limited thereto. The vehicle steering control apparatus 400 may include any kind of control unit which is capable of controlling a vehicle.

The vehicle state information acquisition unit 410 may acquire operating state information on or associated with the steering rack module 300. The steering rack module 300 may be connected to at least one vehicle wheel 500 and may be mechanically separated from the steering column module 200, which is connected to the steering wheel 100.

For instance, the vehicle state information acquisition unit 410 may be connected to the steering column module 200. Here, the steering column module 200 may be connected to the steering wheel 100. In addition, the vehicle state information acquisition unit 410 may acquire operating state information on or associated with the steering column module 200 from the steering column module 200.

Here, the operating state information on or associated with the steering column module 200 may be, for example, but not limited to, information related to operating states and/or operation of the steering column module 200 itself or one or more components included in the steering column module 200. For instance, the operating state information on or associated with the steering column module 200 may include at least one piece of information of steering torque information and/or steering torque sensor signal information on the steering wheel 100, motor angle information of a steering reaction force motor, and steering angle information and/or steering angle sensor signal information on the steering wheel 100, but is not limited thereto. The operating state information on or associated with the steering column module 200 may include any type of information which can be acquired through the operating states and/or operation of the steering column module 200 itself and one or more components included in the steering column module 200.

In addition, the vehicle state information acquisition unit 410 may be connected to the steering rack module 300. Here, the steering rack module 300 may be connected to at least one vehicle wheel 500 and may be mechanically separated from the steering column module 200, which is connected to the steering wheel 100. In addition, the vehicle state information acquisition unit 410 may acquire operating state information on or associated with the steering rack module 300 from the steering rack module 300.

Here, the operating state information on or associated with the steering rack module 300 may be, for instance, but not limited to, information acquired through operating states and/or operation of the steering rack module 300 itself or one or more components included in the steering rack module 300. For example, the operating state information on or associated with the steering rack module 300 may include at least one piece of information among motor angle information of a driving motor, position information of a rack that changes the direction of a vehicle wheel, driving current information of the driving motor for driving the rack and pinion changing the direction of a vehicle wheel, pinion angle information, pinion angle sensor signal information, and rack position sensor signal information, but is not limited thereto. The operating state information on the steering rack module 300 may include any type of information that can be acquired through the operating states and/or operation of the steering rack module 300 itself and one or more components included in the steering rack module 300.

The steering reaction force control unit 420 may be configured to determine the state of a collision with an external object based on the operating state information on or associated with the steering rack module 300. The steering reaction force control unit 420 may be configured to control the operation of the steering column module 200, for instance, but not limited to, the steering reaction force motor which is included in the steering column module 200 and provides steering reaction force to the steering wheel 100, according to the determination result of the state of the collision with the external object.

For instance, the steering reaction force control unit 420 may be connected to the vehicle state information acquisition unit 410. In addition, the steering reaction force control unit 420 may receive the operating state information on or associated with the steering column module 200 from the vehicle state information acquisition unit 410. In addition, the steering reaction force control unit 420 may receive the operating state information on or associated with the steering rack module 300 from the vehicle state information acquisition unit 410.

In addition, the steering reaction force control unit 420 may determine or identify the state of the collision with the external object based on at least one piece of operating state information among the operating state information on or associated with the steering column module 200 and the operating state information on or associated with the steering rack module 300, which are received from the vehicle state information acquisition unit 410.

The steering reaction force control unit 420 may determine whether at least one vehicle wheel 500 ascends a curb by determining the state of the collision with the external object based on at least one piece of operating state information among the operating state information on the steering column module and the operating state information on the steering rack module, which are received from the vehicle state information acquisition unit 410.

Here, the curb may be, for example, but not limited to, an object located on a road surface as an external object (e.g., an object) of the vehicle that can apply an impact (or shaking, vibration, etc.) to the wheel 500 of the vehicle, but is not limited thereto. The curb may include any external object of the vehicle (e.g., a road surface condition, a wall surface, another vehicle, etc.) that can apply an impact to the wheel 500 of the vehicle.

For example, the operating state information on or associated with the steering rack module 300 received from the vehicle state information acquisition unit 410 may include position information of the rack, and the steering reaction force control unit 420 may determine whether the wheel ascends the curb based on the position information of the rack.

That is, the steering reaction force control unit 420 may determine whether the wheel 500 ascends the curb based on the position information of the rack that changes the direction of the wheel 500.

For example, the steering reaction force control unit 420 may compare rack position reference information included in the operating state information on or associated with the steering rack module 300, received from the vehicle state information acquisition unit 410, with actual rack position information, and may determine that the wheel 500 ascends the curb when the difference between the rack position reference value and the actual rack position value (e.g., the difference between absolute values of the rack position reference value and the actual rack position value) exceeds a predetermined rack position difference value based on the comparison result.

Specifically, the steering reaction force control unit 420 may compare the rack position reference information, received from the vehicle state information acquisition unit 410, with the actual rack position information, may determine that the wheel 500 collides with the curb when the difference between the rack position reference value and the actual rack position value (e.g., the difference between the absolute values of the rack position reference value and the actual rack position value) exceeds a predetermined first rack position difference value, and may determine that the wheel 500 ascends the curb when the difference between the rack position reference value and the actual rack position value, which is compared for each specific time period (e.g., a control period—1 ms, or the like) during a predetermined time (e.g., 100 ms, or the like), exceeds a second rack position difference value.

In another example, the operating state information on the steering rack module 300 received from the vehicle state information acquisition unit 410 may include driving current information of a driving motor comprised in the steering column module 200. The steering reaction force control unit 420 may determine whether the wheel 500 ascends the curb based on the driving current information of the driving motor.

The steering reaction force control unit 420 may determine whether the wheel 500 ascends the curb based on the driving current information of the driving motor for driving the rack and pinion, which change the direction of the wheel 500.

For example, the steering reaction force control unit 420 may compare the driving current information (e.g. a driving current value) of or associated with the driving motor for driving the rack and pinion with predetermined maximum driving current information (e.g. a predetermined maximum driving current value, range or the like) of the driving motor, and may determine that the wheel 500 ascends the curb when the driving current value of the driving motor corresponds to or more than the predetermined maximum driving current value (or range or the like) of the driving motor based on the comparison result.

For example, the steering reaction force control unit 420 may compare the driving current information of the driving motor for driving the rack and pinion, which change the direction or angle of the wheel 500, in the operating state information on the steering rack module received from the vehicle state information acquisition unit 410 with the predetermined maximum driving current information of the driving motor, may determine that the wheel 500 collides with the curb when the driving current value of the driving motor reaches or exceeds the predetermined maximum driving current value (or range, or the like) of the driving motor based on the comparison result, and may determine that the wheel 500 ascends the curb when the driving current value of the driving motor maintains the predetermined maximum driving current value (or range, or the like) of the driving motor for each specific time period (e.g., a control period—1 ms, or the like) during a predetermined time (e.g., 100 ms, or the like).

In still another example, the operating state information on or associated with the steering column module 200 received from the vehicle state information acquisition unit 410 may comprise steering angle information and the operating state information on or associated with the steering rack module 300 received from the vehicle state information acquisition unit 410 may comprise angle information of a pinion. The steering reaction force control unit 420 may determine whether the wheel ascends the curb, based on the steering angle information, included in the operating state information on or associated with the steering column module 200, and the angle information of the pinion, comprised in the operating state information on the steering rack module 300.

That is, the steering reaction force control unit 420 may determine whether the wheel 500 ascends the curb based on the steering angle information on the steering wheel 100 comprised in the operating state information on or associated with the steering column module 200, and the angle information of the pinion, which is connected to the rack and changes the direction of the wheel 500, in the operating state information on the steering rack module 300. The operating state information on or associated with the steering column module 200 and/or the operating state information on or associated with the steering rack module 300 may be received from the vehicle state information acquisition unit 410.

For example, the steering reaction force control unit 420 may compare the steering angle information (e.g. a steering angle value) on the steering wheel 100 with the angle information of the pinion (e.g. a pinion angle value), and may determine that the wheel 500 ascends the curb when the difference between the steering angle value and the pinion angle value (e.g., the difference between absolute values of the steering angle value and the pinion angle value) exceeds a predetermined angular difference value based on the comparison result.

Specifically, the steering reaction force control unit 420 may compare the steering angle information on the steering wheel 100 (e.g. a steering angle value) with the angle information of the pinion (e.g. a pinion angle value), may determine that the wheel 500 contacts or collides with the curb when the difference between the steering angle value and the pinion angle value (e.g., the difference between absolute values of the steering angle value and the pinion angle value) exceeds a predetermined first angular difference value based on the comparison result. And the steering reaction force control unit 420 may determine that the wheel 500 ascends the curb when the difference between the steering angle value and the pinion angle value, compared for each specific time period (e.g., a control period—1 ms, or the like) for a predetermined time (e.g., 100 ms, or the like), exceeds a predetermined second angular difference value.

In another example, the operating state information associated with the steering column module 200 may comprise a steering angle of the steering wheel 100 and the operating state information associated with the steering rack module 300 may comprise information on a motor angle of the driving motor. The steering reaction force control unit 420 may determine whether the wheel contacts or ascends the curb based on the steering angle of the steering wheel 100 and the motor angle of the driving motor.

That is, the steering reaction force control unit 420 may determine whether at least one vehicle wheel 500 contacts or ascends the curb, based on the steering angle of the steering wheel 100 comprised in the operating state information associated with the steering column module 200, received from the vehicle state information acquisition unit 410, and the motor angle of the driving motor for driving the rack and pinion, which change the direction of at least one vehicle wheel 500, comprised in the operating state information associated with the steering rack module 300, received from the vehicle state information acquisition unit 410.

For example, the steering reaction force control unit 420 may compare the steering angle of the steering wheel 100 included in the operating state information associated with the steering column module 200, received from the vehicle state information acquisition unit 410, with the motor angle of the driving motor for driving the rack and pinion, which change the direction of at least one vehicle wheel 500, comprised in the operating state information associated with the steering rack module 300, received from the vehicle state information acquisition unit 410, and may determine that at least one vehicle wheel 500 contacts or ascends the curb when the difference between the steering angle value and the motor angle value of the driving motor (e.g., the difference between the absolute values of the steering angle value and the motor angle value of the driving motor) exceeds a predetermined angular difference value based on the comparison result.

Specifically, the steering reaction force control unit 420 may compare the information on a steering angle of or associated with the steering wheel 100, included in the operating state information on the steering column module 200 received from the vehicle state information acquisition unit 410, with the information on a motor angle of the driving motor for driving the rack and pinion, which change the direction of the wheel, comprised in the operating state information associated with the steering rack module 300 received from the vehicle state information acquisition unit 410. The steering reaction force control unit 420 may determine that at least one vehicle wheel 500 contacts or collides with the curb when the difference between the steering angle value and the motor angle value of the driving motor (e.g., the difference between the absolute values of the steering angle value and the motor angle value of the driving motor) exceeds a predetermined first angular difference value based on the comparison result. The steering reaction force control unit 420 may determine that at least one vehicle wheel 500 ascends the curb when the difference between the steering angle value and the motor angle value of the driving motor, which is compared for each specific time period (e.g., a control period—1 ms, or the like) for a predetermined time (e.g., 100 ms, or the like), exceeds a second angular difference value.

As described above, the steer-by-wire-based vehicle steering apparatus and vehicle steering control apparatus according to various exemplary embodiments of the present disclosure may identify, sense or determine the state of the contact or collision with an external object using, for example, but not limited to, information on a position of a rack, information on a driving current of a driving motor, information on a steering angle and/or an angle of a pinion, information on a steering angle and a motor angle of a driving motor, etc., through the steering reaction force control unit, and may control the operation of the steering reaction force motor so that a haptic response may be generated on the steering wheel or the steering wheel may be locked according to the determination result, and thus control information (e.g. the position of the rack, the driving current of the driving motor, the steering angle of the steering wheel and the angle of the pinion, the steering angle and the motor angle value of the driving motor, etc.) may be used without additional device installation, thereby reducing costs.

In another example, the steering reaction force control unit 420 may inspect steering angle sensor signal information, comprised in the operating state information associated with the steering column module 200, and pinion angle sensor signal information and rack position sensor signal information, included in the operating state information associated with the steering rack module 300, and may determine whether at least one vehicle wheel 500 ascends the curb based on information on the position of the rack or steering information and pinion angle information.

Specifically, the steering reaction force control unit 420 may inspect the steering angle sensor signal information, comprised in the operating state information on the steering column module 200 received from the vehicle state information acquisition unit 410, and the pinion angle sensor signal information and the rack position sensor signal information, included in the operating state information on the steering rack module 300 received from the vehicle state information acquisition unit 410.

For example, the steering reaction force control unit 420 may compare, with predetermined normal sensor signal information, the steering angle sensor signal information and the pinion angle sensor signal information and the rack position sensor signal information, and may inspect whether the sensor signal information is normal.

Next, according to the inspection result obtained by inspecting whether the sensor signal information is normal, the steering reaction force control unit 420 may determine whether the wheel 500 ascends the curb based on the information on the position of the rack, which changes the direction of at least one vehicle wheel 500 or based on the information on the steering angle of or associated with the steering wheel 100 and the information on the angle of the pinion, which is connected to the rack and changes the direction of at least one vehicle wheel 500.

For example, when the angle sensor signal information exceeds or is out of a predetermined normal angle sensor signal range based on the inspection result obtained by inspecting whether the angle sensor signal information is normal and the comparison result obtained by comparing at least one piece of angle sensor signal information among the steering angle sensor signal information and the pinion angle sensor signal information with predetermined normal angle sensor signal information, the steering reaction force control unit 420 may determine that the angle sensor is abnormal or defective or malfunctions, and may determine whether at least one wheel 500 ascends the curb based on the position information of the rack, which changes the direction of at least one vehicle wheel 500, included in the operating state information on the steering rack module 300 received from the vehicle state information acquisition unit 410.

Here, a specific method of determining whether the wheel 500 ascends the curb based on the position information of the rack has been described, and thus will be omitted for the sake of brevity.

For example, when position sensor (or displacement sensor) signal information exceeds or is out of a predetermined normal position sensor (or displacement sensor)

signal range based on the inspection result obtained by inspecting whether the position sensor (or displacement sensor) signal information is abnormal and the comparison result obtained by comparing rack position sensor (or rack displacement sensor) signal information with predetermined normal rack position (or displacement sensor) signal information, the steering reaction force control unit 420 may determine that the position sensor (or displacement sensor) is abnormal or defective or malfunctions, and may determine whether at least one wheel 500 ascends the curb based on the information on of the steering angle of the steering wheel 100 included in the operating state information associated with the steering column module 200 received from the vehicle state information acquisition unit 410 and the angle information of the pinion, which is connected to the rack and changes the direction of at least one wheel 500, included in the operating state information on the steering rack module 300 received from the vehicle state information acquisition unit 410.

Here, the specific method of determining whether the wheel 500 ascends the curb based on the steering angle information and the pinion angle information has been described, and thus will be omitted for the sake of brevity.

As described above, the steer-by-wire-based vehicle steering apparatus and vehicle steering control apparatus 400 according to some exemplary embodiments of the present disclosure may inspect the angle sensor signal information and the position (or displacement) sensor signal information through the steering reaction force control unit 420, may determine the state of the contact or collision with an external object based on the inspection result, and may control the operation of a motor for steering reaction force so that a haptic response may be generated on the steering wheel 100 or so that the steering wheel 100 may be locked depending on the determination result, and thus another sensor signal may be used when one sensor signal fails, thereby satisfying reliability requirements as well as redundancy for steering control.

Continuously referring to FIG. 2, the steering reaction force control unit 420 may determine whether at least one vehicle wheel 500 ascends the curb based on at least one of the operating state information on the steering rack module 300 and the operating state information on the steering column module 200, and may control, when at least one vehicle wheel 500 ascends the curb, the operation of the steering reaction force motor so that at least one of the generation of the haptic response on the steering wheel 100 and the locking of the steering wheel 100 may be performed.

That is, the steering reaction force control unit 420 may perform at least one kind of operation control among operation control of the steering reaction force motor, which is included in the steering column module 200 and provides steering reaction force to the steering wheel 100, so that a haptic response is generated on the steering wheel 100, according to the determination result obtained by determining the collision or contact with the external object, that is, the determination result obtained by determining whether at least one vehicle wheel 500 ascends the curb, and operation control of the steering reaction force motor, which is included in the steering column module 200 and provides the steering reaction force to the steering wheel 100, so that the steering wheel 100 is locked.

As described above, the steer-by-wire-based vehicle steering apparatus or vehicle steering control apparatus 400 according to some embodiments of the present disclosure may acquire the operating state information on the steering rack module 300, which is mechanically separated from the steering column module 200, through the vehicle state information acquisition unit 410, may determine the collision or contact with an external object, that is, whether at least one vehicle wheel 500$ ascends the curb, based on the operating state information on the steering rack module through the steering reaction force control unit, and may control the operation of the steering reaction force motor so that a haptic response is generated on the steering wheel according to the determination result, thereby allowing a driver to accurately recognize (or perceive) the state of the collision or contact with the external object (e.g., the collision between at least one vehicle wheel and the curb, or the like) through the haptic response generated on the steering wheel.

As described above, the steer-by-wire-based vehicle steering apparatus or vehicle steering control apparatus 400 according to certain embodiments of the present disclosure may acquire the operating state information on or associated with the steering rack module, which is mechanically separated from the steering column module, through the vehicle state information acquisition unit 410, may determine the collision or contact with an external object (e.g. whether at least one vehicle wheel ascends a curb) based on the operating state information on or associated with the steering rack module through the steering reaction force control unit 420, and may control the operation of the steering reaction force motor so that the steering wheel is locked based on the determination result, thereby allowing the driver to accurately recognize (or perceive) the state of the collision with the external object through the locking of the steering wheel.

Hereinafter, a method of generating a haptic response on the steering wheel 100 through the steering reaction force control unit 420 will be described in detail.

The steering reaction force control unit 420 may control the operation of the steering reaction force motor, which is included in the steering column module 200 and provides steering reaction force to the steering wheel 100, so that a haptic response is generated on the steering wheel 100 according to the determination result obtained by determining the collision or contact of at least one vehicle wheel with an external object.

That is, the steering reaction force control unit 420 may determine whether at least one vehicle wheel 500 ascends the curb by determining the collision or contact of the vehicle wheel 500 with the external object, and may control, when it is determined that the vehicle wheel(s) 500 has ascended the curb based on the determination result, the operation of the steering reaction force motor, included in the steering column module 200, so that a haptic response may be generated on the steering wheel 100.

For example, the steering reaction force control unit 420 may determine whether the vehicle wheel(s) 500 ascends the curb based on at least of the operating state information on or associated with the steering column module 200, received from the vehicle state information acquisition unit 410, and the operating state information on or associated with the steering rack module 300, received from the vehicle state information acquisition unit 410, and may generate a dithered reference current of the steering reaction force motor by dithering a reference current of the steering reaction force motor, included in the steering column module 200, when it is determined that the vehicle wheel(s) 500 has ascended the curb based on the determination result.

For example, the steering reaction force control unit 420 may determine whether the vehicle wheel(s) 500 ascends the curb based on at least one of the operating state information on or associated with the steering column module and the operating state information on or associated with the steering rack module, may generate the dithered reference current of the steering reaction force motor by dithering the reference current of the steering reaction force motor when it is determined that the vehicle wheel(s) 500 has ascended the curb based on the determination result, and may control the operation of the steering reaction force motor by providing the dithered reference current of the steering reaction force motor to the steering reaction force motor for a predetermined time based on the time point at which it is determined that the vehicle wheel(s) 500 ascends the curb, so that a haptic response may be generated on the steering wheel.

Specifically, the steering reaction force control unit 420 may determine whether the vehicle wheel(s) 500 ascends the curb based on the operating state information on the steering column module 200, received from the vehicle state information acquisition unit 410, and the operating state information on the steering rack module 300, received from the vehicle state information acquisition unit 410, and may generate the dithered reference current of the steering reaction force motor by adding a dither to the reference current of the steering reaction force motor, included in the steering column module 200, when it is determined that the vehicle wheel(s) 500 has ascended the curb based on the determination result.

Next, the steering reaction force control unit 420 may control the operation of the steering reaction force motor by providing the dithered reference current of the steering reaction force motor to the steering reaction force motor for the predetermined time based on the time point at which it is determined that the vehicle wheel(s) 500 ascends the curb, so that a haptic response may be generated on the steering wheel 100.

In another example, the steering reaction force control unit 420 may generate a modulated reference current of the steering reaction force motor by modulating the reference current of the steering reaction force motor, and may control the operation of the steering reaction force motor by providing the modulated reference current of the steering reaction force motor to the steering reaction force motor for a predetermined time based on the time point at which it is determined that at least one vehicle wheel 500 ascends the curb, so that a haptic response may be generated on the steering wheel 100.

That is, the steering reaction force control unit 420 may determine whether at least one vehicle wheel 500 ascends the curb based on at least one of the operating state information on the steering column module 200, received from the vehicle state information acquisition unit 410, and the operating state information on the steering rack module 300, received from the vehicle state information acquisition unit 410, and may generate the modulated reference current of the steering reaction force motor by modulating the reference current of the steering reaction force motor included in the steering column module 200 when at least one vehicle wheel 500 is determined to have ascended the curb based on the determination result.

Here, the modulation may include, for example, but not limited to, at least one of pulse width modulation (PWM), optimum modulation, triangular wave comparison modulation, and space vector modulation. The modulation may include any modulation that can modulate a current (or a voltage).

Here, in the modulated reference current of the steering reaction force motor, at least one of frequency and amplitude may be changed (or updated) according to a predetermined level of risk of collision or contact with the curb. For example, as the predetermined level of risk of collision or contact with the curb is increased, the modulated reference current of the steering reaction force motor may be changed (or updated) in a manner such that the frequency and the amplitude are increased.

The steering reaction force control unit 420 may control the operation of the steering reaction force motor by providing the modulated reference current of the steering reaction force motor to the steering reaction force motor for a predetermined time based on the time point at which it is determined that at least one vehicle wheel 500 ascends the curb, so that a haptic response is generated on the steering wheel 100.

As described above, the steer-by-wire-based vehicle steering apparatus and/or vehicle steering control apparatus 400 according to exemplary embodiments of the present disclosure may control the operation of the steering reaction force motor by dithering or modulating the reference current of the steering reaction force motor and providing the dithered or modulated reference current to the steering reaction force motor through the steering reaction force control unit so that a haptic response is generated on the steering wheel 100, and thereby a haptic response may be generated on the steering wheel 100 through the dithered or modulated current according to the state of collision or contact with the external object (e.g., a collision between at least one vehicle wheel and the curb, or the like), thereby allowing the driver to more accurately recognize (or perceive) the state of the collision or contact with the external object (e.g., the collision or contact between at least one vehicle wheel and the curb, or the like).

Hereinafter, various exemplary embodiments of the present disclosure a method of locking the steering wheel 100 through the steering reaction force control unit 420 will be described in detail.

The steering reaction force control unit 420 may control the operation of the steering reaction force motor, which is included in the steering column module 200 and provides a steering reaction force to the steering wheel 100, so that the steering wheel 100 may be locked, according to the determination result obtained by determining the collision or contact with the external object.

That is, the steering reaction force control unit 420 may determine whether at least one vehicle wheel 500 ascends the curb by determining the collision or contact with the external object, and may control, when it is determined that at least one vehicle wheel 500 has ascended the curb based on the determination result, the operation of the steering reaction force motor included in the steering column module 200 so that the steering wheel 100 may be locked.

For example, the steering reaction force control unit 420 may control the operation of the steering reaction force motor by providing a maximum current of the steering reaction force motor to the steering reaction force motor for a predetermined time while increasing the reference current of the steering reaction force motor by the maximum current of the steering reaction force motor from the time point at which it is determined that at least one vehicle wheel 500 ascends the curb so that the steering wheel 100 may be locked.

That is, the steering reaction force control unit 420 may determine whether at least one vehicle wheel 500 ascends the curb based on at least one piece of operating state information among the operating state information on the steering column module 410, received from the vehicle state information acquisition unit 410, and the operating state information on the steering rack module 300, received from the vehicle state information acquisition unit 410, and may increase, when it is determined that at least one vehicle wheel 500 has ascended the curb based on the determination result, the reference current of the steering reaction force motor included in the steering column module 200 by the maximum current of the steering reaction force motor from the time point at which it is determined that at least one vehicle wheel ascends the curb.

Next, the steering reaction force control unit 420 may control the operation of the steering reaction force motor included in the steering column module 200 by providing the maximum current of the steering reaction force motor to the steering reaction force motor for a predetermined time so that the steering wheel 100 may be locked.

Meanwhile, the steering reaction force control unit 420 may inspect information on a steering torque sensor signal, comprised in the operating state information on the steering column module 200, may estimate steering torque based on information on a steering angle and information on a motor angle of the steering reaction force motor, comprised in the operating state information on the steering column module 200, when the information of the steering torque sensor signal is abnormal, and may generate the reference current of the steering reaction force motor based on the estimated steering torque.

For instance, the steering reaction force control unit 420 may generate the reference current of the steering reaction force motor based on the information of steering torque, comprised in the operating state information on the steering column module 200.

The steering reaction force control unit 420 may inspect whether information on a steering torque sensor signal, comprised in the operating state information on the steering column module 200, is normal. When the information on the steering torque sensor is found to be abnormal based on the inspection result obtained by inspecting whether the information on the steering torque sensor signal is normal, the steering reaction force control unit 420 may estimate the steering torque based on the information on the steering angle, included in the operating state information on the steering column module 200, and the information of the motor angle of the steering reaction force motor.

Here, the information on (or value of) steering torque applied by a driver may be calculated by multiplying a torsion bar constant (or value) by twisted angle information (or an angle value) of the torsion bar, and the torsion bar constant (or value) may be a predetermined design value. Here, if the twisted angle information (or angle value) of the torsion bar is calculated, the information on (or value of) steering torque applied by the driver can be calculated.

Therefore, the information on (or value of) steering torque applied by the driver can be estimated based on the difference between the information (or value) of the steering angle and the information (or value) of the motor angle of the steering reaction force motor.

The steering reaction force control unit 420 may generate the reference current of the steering reaction force motor based on the estimated steering torque.

The steering reaction force control unit 420 may determine whether at least one vehicle wheel 500 ascends the curb based on at least one of operating state information on the steering rack module 300 and the operating state information on the steering column module 200, and may control, when at least one vehicle wheel 500 ascends the curb, the operation of the steering reaction force motor so that at least one of the generation of a haptic response on the steering wheel 100 and the locking of the steering wheel 100 may be performed based on the estimated steering torque.

Here, a method of generating a haptic response on the steering wheel 100 and locking the steering wheel 100 has been described above, and thus will be omitted for the sake of brevity.

As described above, the steer-by-wire-based vehicle steering apparatus and/or vehicle steering control apparatus 400 according to exemplary embodiments of the present disclosure may control the operation of the steering reaction force motor by providing the reference current of the steering reaction force motor to the steering reaction force motor through the steering reaction force control unit so that the steering wheel 100 may be locked, thereby allowing a driver to more accurately recognize (or perceive) the state of the collision or contact with the external object (e.g., the collision between at least one vehicle wheel 500 and the curb or the like).

A "unit" or may refer to a hardware based unit, software based unit or a combination of hardware and software. Embodiments of hardware based units may include self-contained components such as processors, chipsets, specialized circuitry and one or more memory devices, while a software-based module may be part of a program code or linked to the program code containing specific programmed instructions, which may be loaded in the memory. The "unit" (whether hardware, software, or a combination thereof) may be designed to implement or execute one or more particular functions or routines.

Hereinafter, a steer-by-wire-based vehicle steering method according to various exemplary embodiments of the present disclosure will be described with reference to the accompanying drawings. In particular, portions overlapping the exemplary embodiments of the steer-by-wire-based vehicle steering apparatus and vehicle steering control apparatus described above with reference to FIGS. 1 and 2 will be omitted herein for the sake of brevity.

The steer-by-wire-based vehicle steering method or the method of controlling a steer-by-wire-based vehicle according to various exemplary embodiments of the present disclosure may include: acquiring operating state information on a steering rack module, which is connected to a wheel and is mechanically separated from a steering column module connected to a steering wheel; determining the state of a collision with an external object based on the operating state information on the steering rack module; and controlling an operation of a steering reaction force motor, which is included in the steering column module and provides a steering reaction force to the steering wheel based on the determination result.

In certain exemplary embodiments of the present disclosure, the determining the state of the collision with the external object may include determining whether the wheel ascends a curb based on position information of a rack in the operating state information on the steering rack module.

In some exemplary embodiments of the present disclosure, the determining the state of the collision with the external object may include determining whether the wheel ascends the curb based on driving current information of a driving motor in the operating state information on the steering rack module.

In various exemplary embodiments of the present disclosure, before the acquiring of the operating state information on the steering rack module or before the determining of the state of the collision with the external object, the steer-by-wire-based vehicle steering method may further include acquiring operating state information on the steering column module, and the determining the state of the collision with the external object may include determining whether the wheel ascends the curb based on steering angle information in the operating state information on the steering column module and angle information of a pinion in the operating state information on the steering rack module.

In some exemplary embodiments of the present disclosure, before the acquiring of the operating state information on the steering rack module or before the determining the state of the collision with the external object, the steer-by-wire-based vehicle steering method may further include acquiring operating state information on the steering column module, and the determining the state of the collision with the external object may include determining whether the wheel ascends the curb based on steering angle information in the operating state information on the steering column module and motor angle information of a driving motor in the operating state information on the steering rack module.

In certain exemplary embodiments of the present disclosure, before the acquiring of the operating state information on the steering rack module or before the determining of the state of the collision with the external object, the steer-by-wire-based vehicle steering method may further include acquiring operating state information on the steering column module, and the determining of the state of the collision with the external object may include inspecting steering angle sensor signal information in the operating state information on the steering column module, and pinion angle sensor signal information and rack position sensor signal information in the operating state information on the steering rack module; and determining whether the wheel ascends the curb based on position information of a rack or based on steering angle information and angle information of a pinion according to the inspection result.

In various exemplary embodiments of the present disclosure, before the acquiring of the operating state information on the steering rack module or before the determining the state of the collision with the external object, the steer-by-wire-based vehicle steering method may further include acquiring operating state information on the steering column module, and the determining the state of the collision with the external object may include determining whether the wheel ascends the curb based on at least one piece of operating state information of the operating state information on the steering rack module and the operating state information on the steering column module. The controlling of the operation of the steering reaction force motor may include controlling the operation of the steering reaction force motor so that at least one of generation of a haptic response on the steering wheel and locking of the steering wheel is performed when the wheel ascends the curb.

In some exemplary embodiments of the present disclosure, the controlling of the operation of the steering reaction force motor may include generating a dithered reference current of the steering reaction force motor by dithering a reference current of the steering reaction force motor when the wheel ascends the curb and controlling the operation of the steering reaction force motor by providing the dithered reference current of the steering reaction force motor to the steering reaction force motor for a predetermined time based on the time point at which it is determined that the wheel ascends the curb so that a haptic response is generated on the steering wheel.

In various exemplary embodiments of the present disclosure, the controlling of the operation of the steering reaction force motor may include generating a modulated reference current of the steering reaction force motor by modulating a reference current of the steering reaction force motor and controlling the operation of the steering reaction force motor by providing the modulated reference current of the steering reaction force motor to the steering reaction force motor for a predetermined time based on the time point at which it is determined that the wheel ascends the curb so that a haptic response is generated on the steering wheel.

In some exemplary embodiments of the present disclosure, the controlling of the operation of the steering reaction force motor may include increasing the reference current of the steering reaction force motor by a maximum current of the steering reaction force motor from the time point at which it is determined that the wheel ascends the curb when the wheel ascends the curb; and controlling the operation of the steering reaction force motor by providing the maximum current of the steering reaction force motor to the steering reaction force motor for a predetermined time so that the steering wheel is locked.

In certain exemplary embodiments of the present disclosure, before the acquiring of the operating state information on the steering rack module or before the determining of the state of the collision with the external object, the steer-by-wire-based vehicle steering method may further include acquiring operating state information on the steering column module, and the determining of the state of the collision with the external object may include determining whether the wheel ascends the curb based on at least one piece of operating state information of the operating state information on the steering rack module and the operating state information on the steering column module. The controlling of the operation of the steering reaction force motor may include inspecting steering torque sensor signal information in the operating state information on the steering column module when the wheel ascends the curb; and estimating a steering torque based on steering angle information in the operating state information on the steering column module and motor angle information of the steering reaction force motor when the steering torque sensor signal information is abnormal and controlling the operation of the steering reaction force motor so that at least one of generation of a haptic response on the steering wheel and locking of the steering wheel is performed based on the estimated steering torque.

Figure 3:
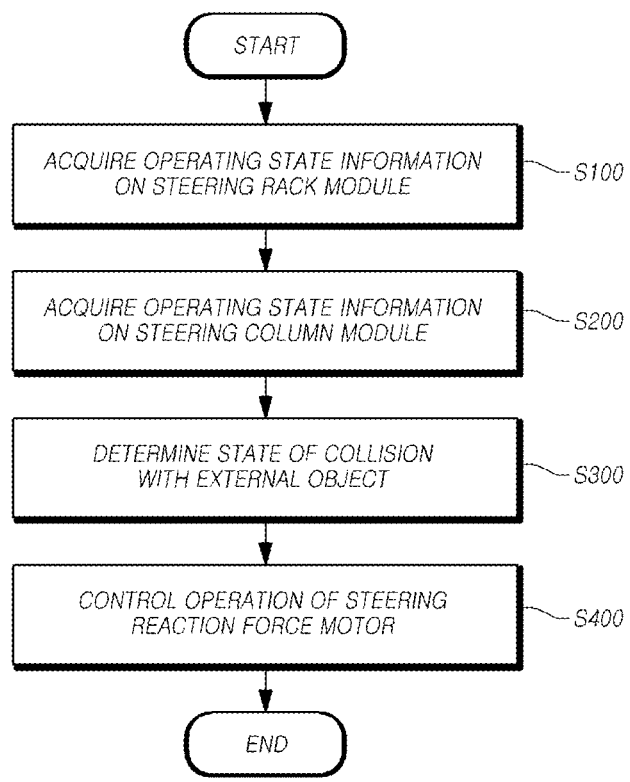
FIG. 3 shows an overall flowchart illustrating a steer-by-wire-based vehicle steering method according to an embodiment of the present disclosure.

FIG. 3 shows an overall flowchart of a steer-by-wire-based vehicle steering method according to an exemplary embodiment of the present disclosure.

Referring to FIG. 3, the steer-by-wire-based vehicle steering method may include one or more operations of acquiring operating state information on or associated with a steering rack module (or information associated with a state of operating a steering rack module) (operation S100); acquiring operating state information on or associated with a steering column module (or information associated with a state of operating a steering column module) (operation S200); determining a state of a collision or contact with an external object (operation S300); and controlling an operation of a steering reaction force motor (operation S400).

In particular, the steer-by-wire-based vehicle steering method according to some exemplary embodiments of the present disclosure may be performed using the steer-by-wire-based vehicle steering apparatus and vehicle steering control apparatus according to certain exemplary embodiments of the present disclosure.

In operation S100, the steer-by-wire-based vehicle steering method may acquire the operating state information on the steering rack module 300, which is connected to at least one vehicle wheel 500 and is mechanically separated from the steering column module 200 connected to the steering wheel 100.

In operation S200, the steer-by-wire-based vehicle steering method may acquire the operating state information on the steering column module 200. Here, operation S200 may be performed after operation S100 as shown in FIG. 3, although it is not required. Alternatively, operation S200 may be performed before operation S100.

In operation S300, the steer-by-wire-based vehicle steering method may determine the state of the collision or contact with the external object based on the operating state information on or associated with the steering rack module 300.

For instance, in operation S300, the vehicle steering method may determine the state of the collision or contact of at least one vehicle wheel 500 with the external object based on at least of the operating state information on associated with the steering rack module 300, acquired in operation S100, and the operating state information on or associated with the steering column module 200, acquired in operation S200.

In operation S400, the vehicle steering method may control the operation of the steering reaction force motor, which may be included in the steering column module 200 and may provide steering reaction force to the steering wheel 100, according to the determination result of operation S300.

For example, in operation S400, the vehicle steering method may control the operation of the steering reaction force motor so that at least one of generation of a haptic response on the steering wheel 100 and locking of the steering wheel 100 may be performed when at least one vehicle wheel 500 ascends the curb, based on the determination result obtained by determining whether at least one vehicle wheel ascends the curb in operation S300.

FIGS. 4 to 8 show flowcharts of a method of determining whether at least one vehicle wheel ascends a curb by determining the state of collision or contact with an external object according to exemplary embodiments of the present disclosure.

Figure 4:
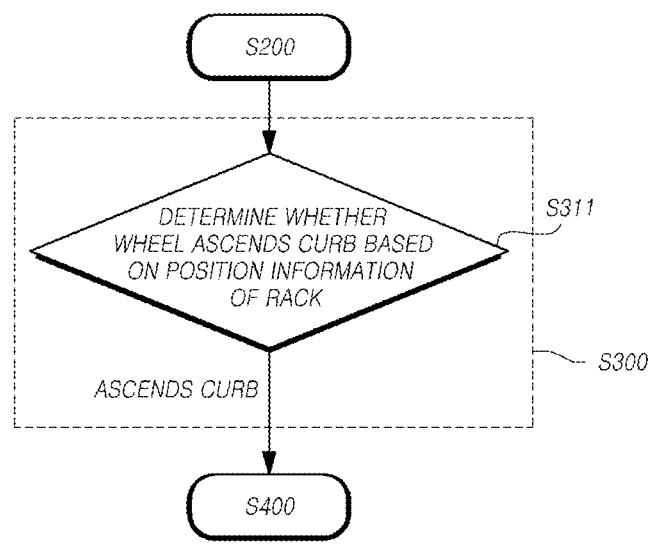
FIGS. 4 to 8 show flowcharts of methods of determining whether a vehicle wheel ascends a curb by determining the state of collision with an external object according to embodiments of the present disclosure.

Referring to FIG. 4, operation S300 may comprise operation S311. In operation S311, the method may determine whether at least one vehicle wheel ascends the curb based on position information of a rack, comprised in the operating state information on or associated with the steering rack module 300.

For example, in operation S311, the method may determine whether at least one vehicle wheel 500 ascends the curb based on the information of the position of the rack, which may change the direction of at least one vehicle wheel 500, comprised in the operating state information on or associated with the steering rack module 300 acquired in operation S100.

Specifically, the method may first compare rack position reference information, comprised in the operating state information on the steering rack module acquired in operation S100, with information on or associated with an actual rack position.

Next, when a difference between a rack position reference value and an actual rack position value (e.g., a difference between absolute values of the rack position reference value and the actual rack position value) exceeds a predetermined rack position difference value based on the comparison result, it may be determined that at least one vehicle wheel 500 has ascended the curb.

That is, when the difference between the rack position reference value and the actual rack position value (e.g., the difference between the absolute values of the rack position reference value and the actual rack position value) is found to exceed a predetermined first rack position difference value based on the comparison result, it may be determined that at least one vehicle wheel 500 has collided or contacted with the curb, and when the difference between the rack position reference value and the actual rack position value is compared for each specific time period (e.g., a control period—1 ms, or the like) during a predetermined time (e.g., 100 ms, or the like) and the compared difference is found to exceed a second rack position difference value, it may be determined that at least one vehicle wheel 500 has ascended the curb.

Figure 5:
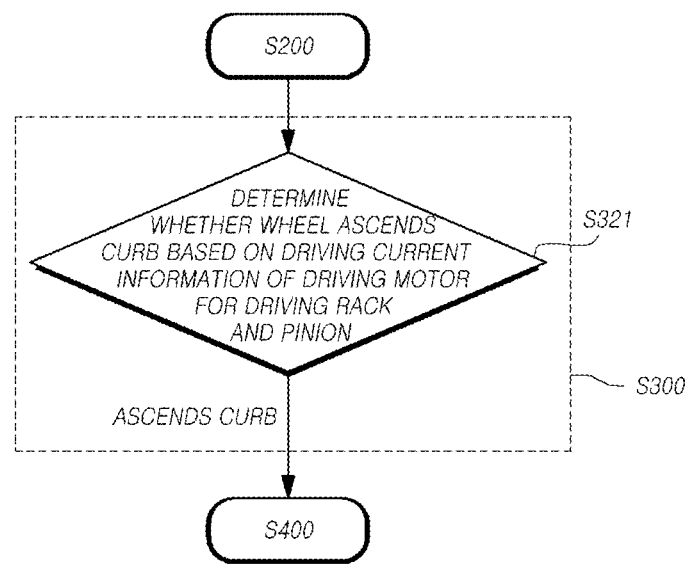

Referring to FIG. 5, operation S300 may comprise operation S321. In operation 321, the method may determine whether at least one vehicle wheel ascends the curb based on driving current information of a driving motor, comprised on, in the operating state information on or associated with the steering rack module 300.

For example, in operation S321, the method may determine whether at least one vehicle wheel 500 ascends the curb based on the information of or associated with the driving current of the driving motor for driving the rack and the pinion, which may change the direction of at least one vehicle wheel 500, comprised in the operating state information on or associated with the steering rack module 300 acquired in operation S100.

Specifically, the method may first compare the information of the driving current of the driving motor for driving the rack and the pinion, which may change the direction of at least one vehicle wheel 500, comprised in the operating state information on the steering rack module 300 acquired in operation S100, with predetermined maximum driving current information of the driving motor.

Next, when a driving current value of the driving motor reaches a predetermined maximum driving current value (or range or the like) of the driving motor based on the comparison result, it may be determined that at least one vehicle wheel 500 has collided or contacted with the curb, and when the driving current value of the driving motor maintains the predetermined maximum driving current value (or range or the like) of the driving motor for each specific time period (e.g., a control period—1 ms, or the like) during a predetermined time (e.g., 100 ms, or the like), it may be determined that at least one vehicle wheel 500 has ascended the curb.

Figure 6:
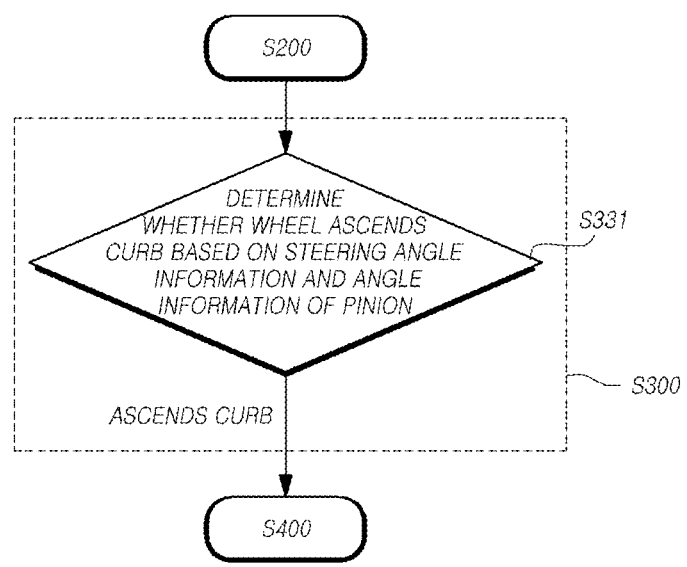

Referring to FIG. 6, operation S300 may comprise operation S331. In operation S331, the method may determine whether at least one vehicle wheel ascends the curb based on steering angle information, comprised in the operating state information on the steering column module, and angle information of the pinion, comprised in the operating state information on the steering rack module.

For example, in operation S331, the method may determine whether at least one vehicle wheel 500 ascends the curb, based on the information on or associated with the steering angle the steering wheel 100, comprised in the operating state information on or associated with the steering column module 200 acquired in operation S200, and the information of the angle of the pinion, which may be connected to the rack and change the direction of at least one vehicle wheel 500, comprised in the operating state information on or associated with the steering rack module 300 acquired in operation S100.

Specifically, the method may first compare the information on or associated with the steering angle of the steering wheel 100, included in the operating state information on or associated with the steering column module 200 acquired in operation S200, with the information on or associated with the angle of the pinion, which may connected to the rack and change the direction of at least one vehicle wheel 500, comprised in the operating state information on or associated with the steering rack module 300 acquired in operation S100.

Next, when a difference between a steering angle value and a pinion angle value (e.g., a difference between absolute values of the steering angle value and the pinion angle value) is found to exceed a predetermined angular difference value based on the comparison result, it may be determined that at least one vehicle wheel 500 has ascended the curb.

For example, when the difference between the steering angle value and the pinion angle value (e.g., the difference between absolute values of the steering angle value and the pinion angle value) is found to exceed a predetermined first angular difference value based on the comparison result, it may be determined that at least one vehicle wheel 500 has collided or contacted with the curb, and when the difference between the steering angle value and the pinion angle value is compared for each specific time period (e.g., a control period—1 ms, or the like) during a predetermined time (e.g., 100 ms, or the like) and the compared difference is found to exceed a second angular difference value, it may be determined that at least one vehicle wheel 500 has ascended the curb.

Figure 7:
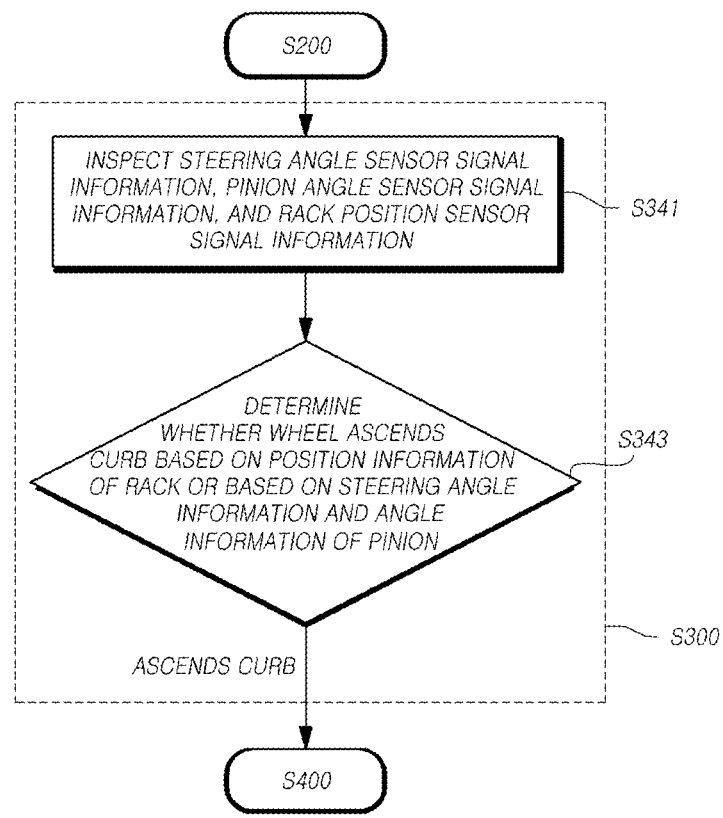

Referring to FIG. 7, operation S300 may comprise operations S341 and S343. In operation S300, the method may inspect steering angle sensor signal information, included in the operating state information on the steering column module, and pinion angle sensor signal information and rack position sensor signal information, comprised in the operating state information on the steering rack module, and may determine whether at least one vehicle wheel ascends the curb based on the position information of the rack or based on the steering angle information and the angle information of the pinion according to the inspection result.

For example, in operation S341, the method may first inspect the information on or associated with the steering angle sensor signal, comprised in the operating state information on or associated with the steering column module 200 acquired in operation S200, and the information on or associated with the pinion angle sensor signal and the information on or associated with the rack position sensor signal, comprised in the operating state information on the steering rack module 300 acquired in operation S100.

That is, the method may inspect whether sensor signal information is normal by first comparing the information on or associated with the steering angle sensor signal, comprised in the operating state information on or associated with the steering column module acquired in operation S200, and the information on or associated with the pinion angle sensor signal and the information on or associated with the rack position sensor signal, comprised in the operating state information on or associated with the steering rack module 300 acquired in operation S100, with predetermined normal sensor signal information.

Next, the method may determine whether at least one vehicle wheel 500 ascends the curb, based on the information of the position of the rack, which may change the direction of at least one vehicle wheel 500, comprised in the operating state information on or associated with the steering rack module 300 acquired in operation S100, based on the information on or associated with the steering angle of the steering wheel 100, comprised in the operating state information on or associated with the steering column module 300 acquired in operation S200, or based on the information on or associated with the angle of the pinion, which may be connected to the rack and change the direction of at least one vehicle wheel 500, comprised in the operating state information on the steering rack module 300 acquired in operation S100.

For example, when the information of the angle sensor signal exceeds or is out of a predetermined normal angle sensor signal range based on the inspection result obtained by inspecting whether the information of the angle sensor signal is normal and the comparison result obtained by comparing at least one piece of angle sensor signal information of the steering angle sensor signal information and the pinion angle sensor signal information with predetermined normal angle sensor signal information, it may be determined that the angle sensor is defective or abnormal or malfunctions, and whether at least one vehicle wheel 500 ascends the curb may be determined based on the information on or associated with the position of the rack, which may change the direction of at least one vehicle wheel 500, comprised in the operating state information on associated with the steering rack module 300 acquired in operation S100.

Here, the specific method of determining whether at least one vehicle wheel 500 ascends the curb based on the information of the position of the rack has been described above, and thus will be omitted for the sake of brevity.

In another example, when information on or associated with a position sensor (or displacement sensor) signal exceeds is out of a predetermined normal position sensor (or displacement sensor) signal range based on the inspection result obtained by inspecting whether the information on or associated with the position sensor (or displacement sensor) signal is normal and the comparison result obtained by comparing information on or associated with rack position sensor (or rack displacement sensor) signal with predetermined normal rack position sensor (or displacement sensor) signal information, the method may determine that the position sensor (or displacement sensor) is defective or abnormal or malfunctions, and may determine whether at least one vehicle wheel 500 ascends the curb, based on the information on or associated with the steering angle on the steering wheel 100, included in the operating state information on or associated with the steering column module 100 acquired in operation S200, and the information on or associated with the angle of the pinion, which can be connected to the rack and change the direction of at least one vehicle wheel 500, comprised in the operating state information on or associated with the steering rack module 300 acquired in operation S100.

Here, the specific method of determining whether at least one vehicle wheel 500 ascends the curb based on the information on or associated with the steering angle and the information of the angle of the pinion has been described above, and thus will be omitted for the sake of brevity.

Figure 8:
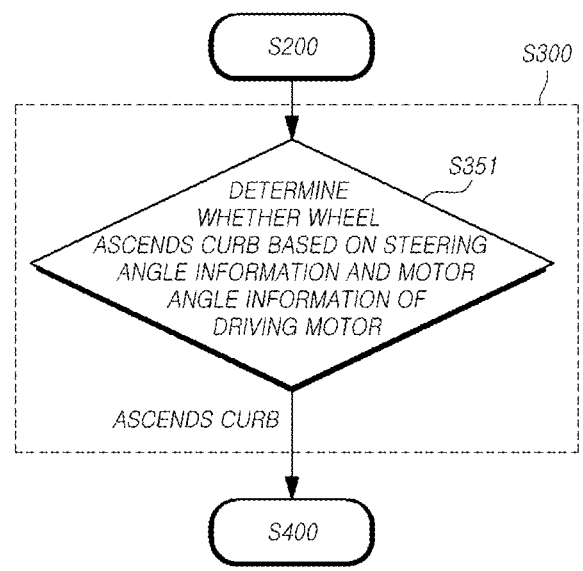

Referring to FIG. 8, operation S300 may comprise S351. In operation S351, the method may determine whether at least one vehicle wheel ascends the curb based on the steering angle information, comprised in the operating state information on or associated with the steering column module, and the motor angle information of the driving motor, comprised in the operating state information on or associated with the steering rack module.

For example, in operation S351, the method may determine whether at least one vehicle wheel 500 ascends the curb, based on the information on or associated with the steering angle of the steering wheel 100, comprised in the operating state information on or associated with the steering column module 200 acquired in operation S200, and the information on or associated with the motor angle of the driving motor for driving the rack and the pinion, which may change the direction of at least one vehicle wheel 500, comprised in the operating state information on or associated with the steering rack module 300 acquired in operation S100.

Specifically, the method may first compare the information on or associated with the steering angle of the steering wheel 100, comprised in the operating state information on or associated with the steering column module 200 acquired in operation S200, with the information on or associated with the motor angle of the driving motor for driving the rack and the pinion, which may change the direction of at least one vehicle wheel 500, comprised in the operating state information on or associated with the steering rack module 300 acquired in operation S100.

Next, when the difference between a steering angle value and a motor angle value of the driving motor (e.g., a difference between absolute values of the steering angle value and the motor angle value of the driving motor) is found to exceed a predetermined angular difference value based on the comparison result, it may be determined that at least one vehicle wheel 500 ascends the curb.

For example, when the difference between the steering angle value and the motor angle value of the driving motor (e.g., the difference between the absolute values of the steering angle value and the motor angle value of the driving motor) exceeds a predetermined first angular difference value based on the comparison result, it may be determined that at least one wheel 500 has collided or contacted with the curb, and when the difference between the steering angle value and the motor angle value of the driving motor is compared for a specific time period (e.g., a control period—1 ms, or the like) for a predetermined time (e.g., 100 ms, or the like) and the compared difference exceeds a second angular difference value, it may be determined that at least one vehicle wheel 500 has ascended the curb.

Figure 9:
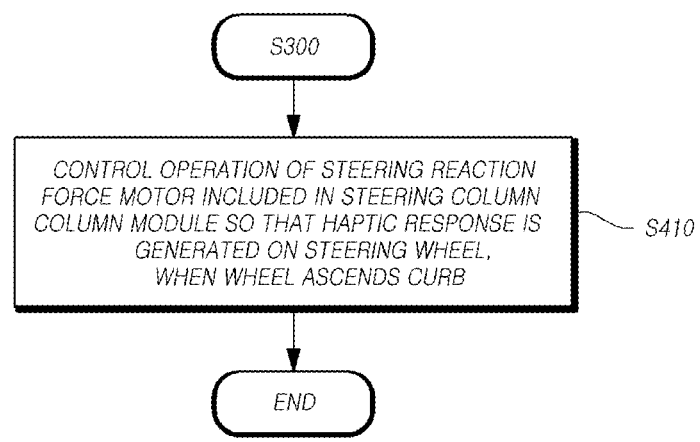
FIGS. 9 to 11 show flowcharts of methods of generating a haptic response on a steering wheel according to embodiments of the present disclosure.
Figure 10:
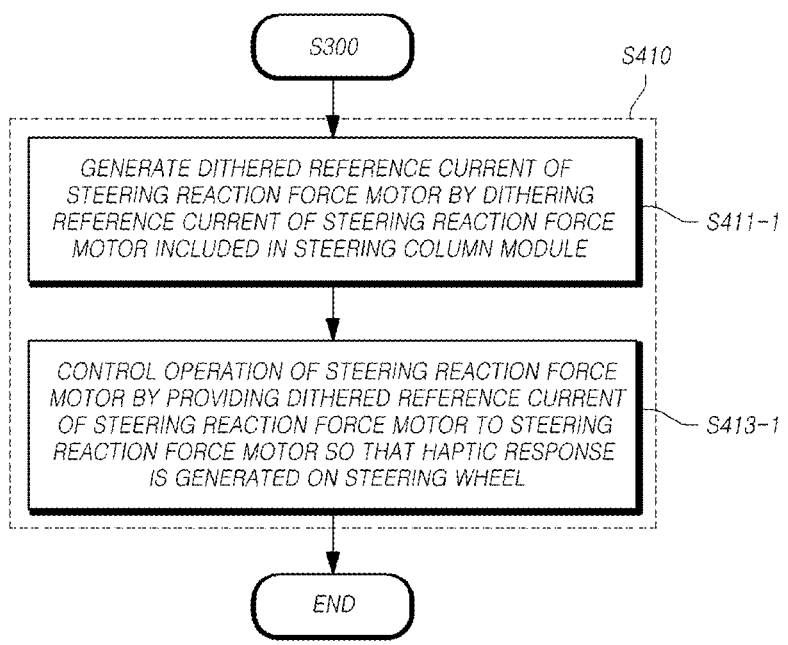
Figure 11:
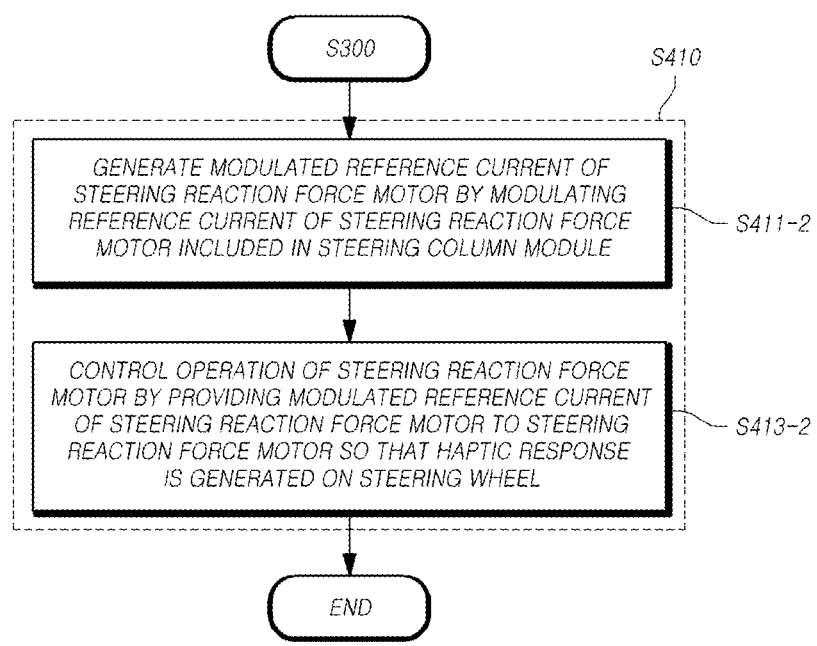

FIGS. 9 to 11 show flowcharts of a method of generating a haptic response on a steering wheel according to exemplary embodiments of the present disclosure.

Referring to FIG. 9, in operation S410, the method may control the operation of steering reaction force motor, which may be included in the steering column module 200 and provide steering reaction force to the steering wheel 100 so that a haptic response is generated on the steering wheel 100, according to the determination result obtained by determining the collision or contact with the external object.

For example, when at least one vehicle wheel 500 is determined to have ascended the curb based on the determination result obtained by determining the collision or contact with the external object, the method may control the operation of the steering reaction force motor included in the steering column module 200 so that a haptic response may be generated on the steering wheel 100.

Referring to FIG. 10, operation S410 may comprise operations S411-1 and S413-1. In operation S411-1, when at least one vehicle wheel 500 is determined to have ascended the curb based on the determination result obtained by determining the collision or contact with the external object, the method may generate a dithered reference current of the steering reaction force motor by dithering a reference current of the steering reaction force motor included in the steering column module 200.

For example, when at least one vehicle wheel 500 is determined to have ascended the curb based on the determination result obtained by determining the collision or contact with the external object, the method may generate the dithered reference current of the steering reaction force motor by adding a dither to the reference current of the steering reaction force motor included in the steering column module 200.

Next, in operation S413-1, the method may control the operation of the steering reaction force motor by providing the dithered reference current of the steering reaction force motor to the steering reaction force motor for a predetermined time based on the time point at which it is determined that the wheel 500 ascends the curb so that a haptic response may be generated on the steering wheel 100.

Referring to FIG. 11, operation S410 may comprise operations S411-2 and S413-2. In operation S411-2, when at least one vehicle wheel 500 is determined to have ascended the curb based on the determination result obtained by determining the collision or contact with the external object, the method may generate a modulated reference current of the steering reaction force motor by modulating a reference current of the steering reaction force motor included in the steering column module 200.

Next, in operation S413-2, the method may control the operation of the steering reaction force motor by providing the modulated reference current of the steering reaction force motor to the steering reaction force motor for a predetermined time based on the time point at which it is determined that at least one vehicle wheel 500 ascends the curb so that a haptic response may be generated on the steering wheel 100.

Figure 12:
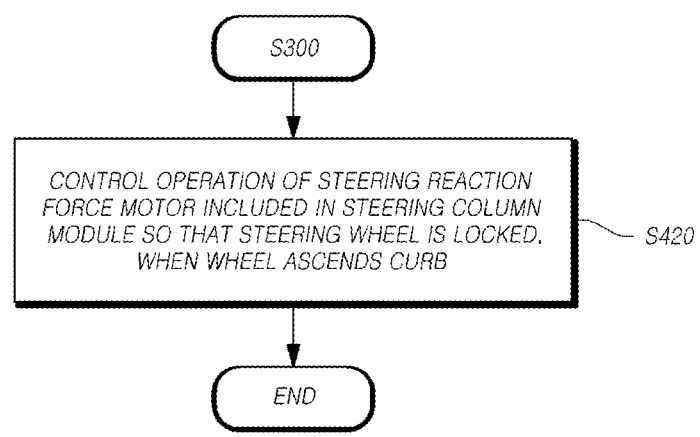
FIGS. 12 and 13 show flowcharts of methods of locking a steering wheel according to embodiments of the present disclosure.
Figure 13:
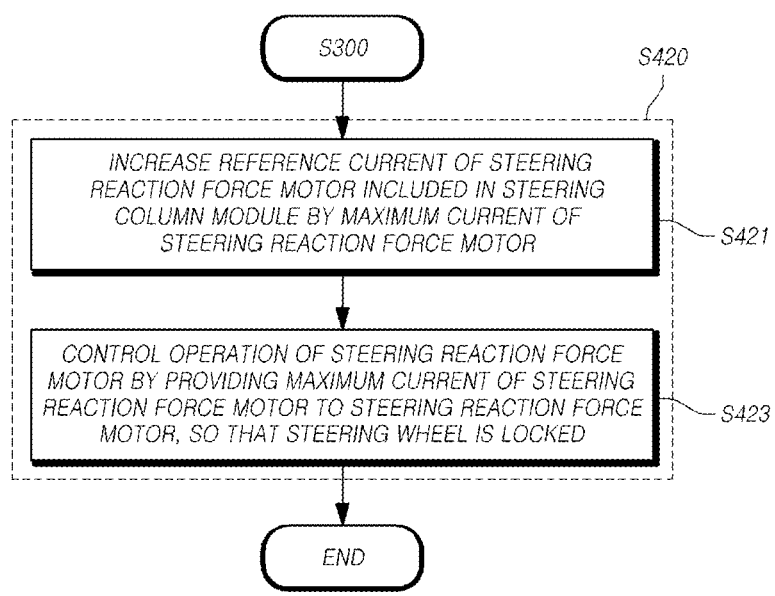

FIGS. 12 and 13 show flowcharts of a method of locking a steering wheel according to exemplary embodiments of the present disclosure.

Referring to FIG. 12, in operation S420, the method may control the operation of the steering reaction force motor, which may be included in the steering column module 200 and provide steering reaction force to the steering wheel 100 so that the steering wheel 100 may be locked, according to the determination result obtained by determining the collision or contact with the external object.

For example, when at least one vehicle wheel 500 is determined to have ascended the curb based on the determination result obtained by determining the collision or contact with the external object, the method may control the operation of the steering reaction force motor, which may be included in the steering column module 200 and provide steering reaction force to the steering wheel 100 so that the steering wheel 100 may be locked.

Referring to FIG. 13, operation S420 may comprise operations S421 and S423. In operation 421, when at least one vehicle wheel 500 is determined to have ascended the curb based on the determination result obtained by determining the collision or contact with the external object, the method may increase the reference current of the steering reaction force motor included in the steering column module 200 by the maximum current of the steering reaction force motor from the time point at which it is determined that at least one vehicle wheel 500 ascends the curb.

Next, in operation S423, the method may control the operation of the steering reaction force motor included in the steering column module 200 by providing the maximum current of the steering reaction force motor to the steering reaction force motor for a predetermined time so that the steering wheel 100 may be locked.

Figure 14:
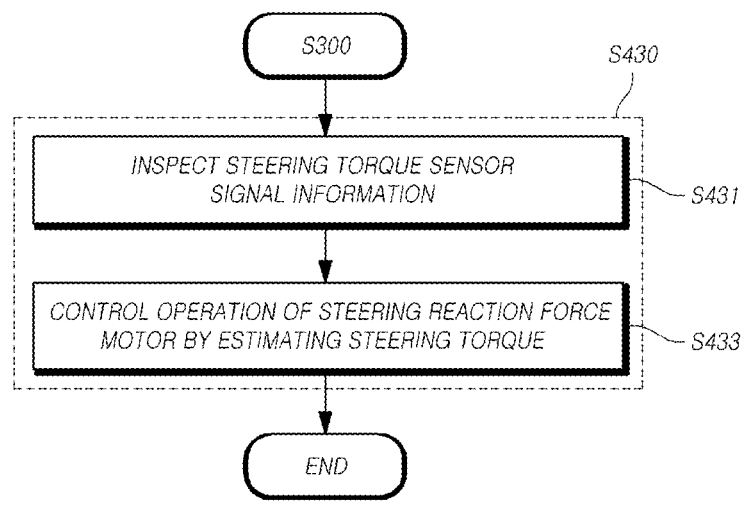
FIG. 14 shows a flowchart of a method of controlling a steering reaction force motor according to an embodiment of the present disclosure.

FIG. 14 shows a flowchart of a method of controlling a steering reaction force motor according to an exemplary embodiment of the present disclosure.

Referring to FIG. 14, the method of controlling the steering reaction force motor according to the present embodiment may inspect steering torque sensor signal information in the operating state information on or associated with the steering column module, may estimate steering torque based on the steering angle information, included in the operating state information on or associated with the steering column module, and the motor angle information of the steering reaction force motor when the steering torque sensor signal information is abnormal, and may generate the reference current of the steering reaction force motor based on the estimated steering torque.

For example, in operation S430, when at least one vehicle wheel 500 ascends the curb, the method may inspect the information on or associated with the steering torque sensor signal, comprised in the operating state information on or associated with the steering column module 200, may estimate the steering torque based on the information of the steering angle, comprised in the operating state information on or associated with the steering column module 200, and the information on or associated with the motor angle of the steering reaction force motor when the information on or associated with the steering torque sensor signal is abnormal, and may control the operation of the steering reaction force motor so that at least one of generation of a haptic response on the steering wheel 100 and locking of the steering wheel 100 may be performed based on the estimated steering torque.

Specifically, in operation S431, the method may inspect the information on or associated with steering torque sensor signal, included in the operating state information on or associated with the steering column module 200. That is, in operation S431, when it is determined that at least one vehicle wheel 500 ascends the curb in operation S300, the method may inspect whether the information on or associated with the steering torque sensor signal, included in the operating state information on or associated with the steering column module 200 is normal.

Next, in operation S433, the method may estimate the steering torque to control the operation of the steering reaction force motor. For example, in operation S433, when the information on or associated with the steering torque sensor signal is found to be abnormal based on the inspection result obtained by inspecting whether the information on or associated with the steering torque sensor signal is normal, the method may estimate the steering torque based on the information on or associated with the steering angle, comprised in the operating state information on or associated with the steering column module 200 and the information on or associated with the motor angle of the steering reaction force motor.

Here, the information on (or value of) steering torque applied by a driver may be calculated by multiplying a torsion bar constant (or value) by the twisted angle information (or angle value) of the torsion bar, and the torsion bar constant information (or value) may be a predetermined design value. Here, if the twisted angle information (or angle value) of the torsion bar is calculated, the information on (or value of) steering torque applied by the driver can be calculated. Therefore, according to some embodiments of the present disclosure, the information on (or value of) steering torque applied by the driver can be estimated by a difference value between the steering angle information (or value) and the motor angle information (or value) of the steering reaction force motor.

Next, the method may generate the reference current of the steering reaction force motor based on the estimated steering torque.

That is, the method may control the operation of the steering reaction force motor so that at least one of the generation of a haptic response on the steering wheel 100 and the locking of the steering wheel 100 may be performed based on the estimated steering torque.

Figure 15:
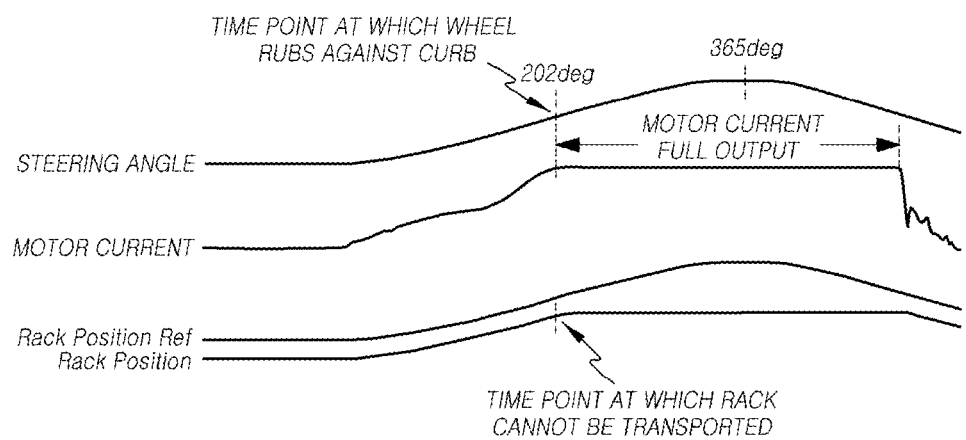
FIG. 15 is a waveform diagram illustrating the state of operation of a steer-by-wire-based vehicle steering apparatus when a vehicle wheel ascends a curb.

FIG. 15 is a waveform diagram illustrating the state of operation of a steer-by-wire-based vehicle steering apparatus when a wheel ascends a curb.

Referring to FIG. 15, at the moment when at least one vehicle wheel 500 rubs against the curb, the steering wheel 100 may continue to move (rotate) up to 365 degrees without stopping, for example, at 202 degrees. The driving motor included in the steering rack module 300 may be driven by a maximum driving current (or motor current) at the moment when the wheel 500 rubs against the curb. A rack position reference may be gradually increased at the moment when the wheel 500 rubs against the curb. An actual rack position may not move at the moment when the wheel 500 rubs against the curb.

Figure 16:
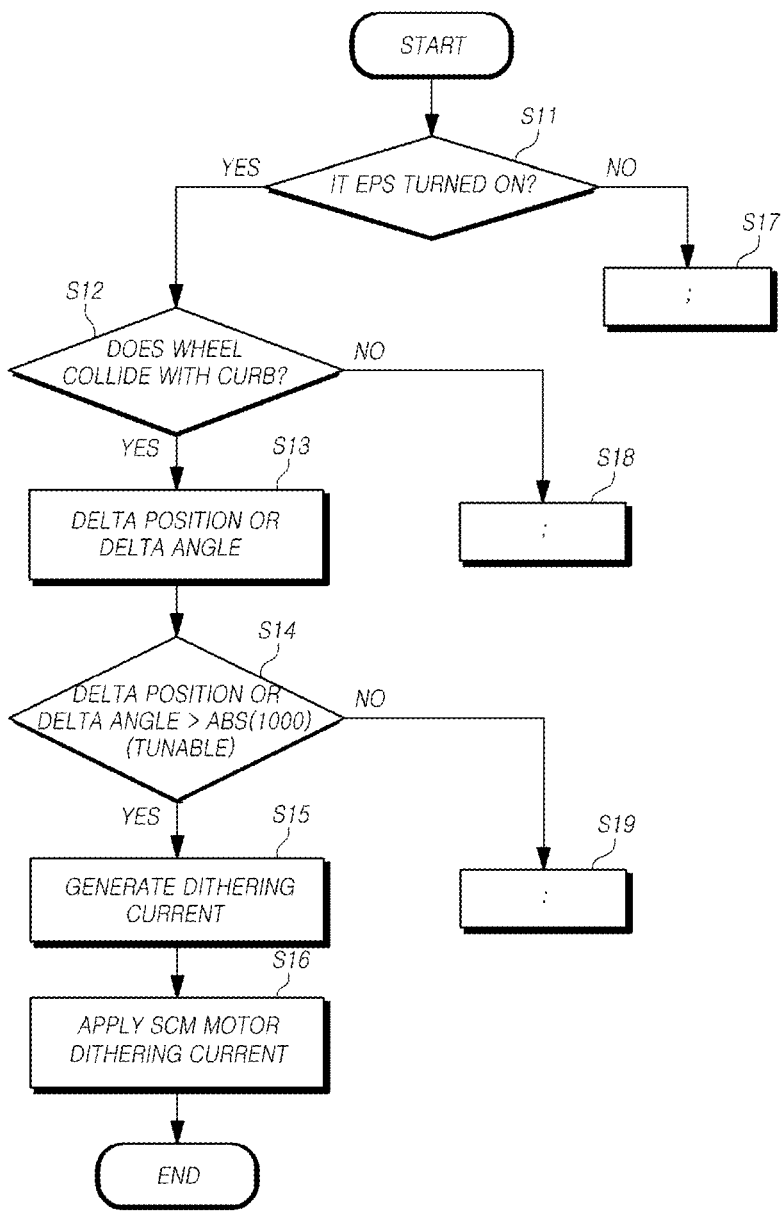
FIG. 16 shows a detailed diagram of a method of generating a haptic response on a steering wheel according to an embodiment of the present disclosure.

FIG. 16 shows a detailed diagram of a method of generating a haptic response on a steering wheel according to an embodiment of the present disclosure.

Referring to FIG. 16, in operation S11, the method may first determine whether an EPS is turned on. Next, in operation S12, when the EPS is turned on, whether at least one vehicle wheel 500 collides with the curb may be determined. Next, in operation S13 and S14, when at least one vehicle wheel 500 collides with the curb, whether at least one vehicle wheel 500 ascends the curb may be determined. Here, whether at least one vehicle wheel 500 ascends the curb may be determined by delta position information (i.e., a difference between absolute values of the rack position reference value and the actual rack position value) or delta angle information (i.e., a difference between absolute values of the steering angle value and the pinion angle value).

In operation S13 to S15, the method may compare the delta position information or the delta angle information for each specific time period (e.g., a control period—1 ms, or the like) during a predetermined time (e.g., 100 ms, or the like), may determine that at least one vehicle wheel 500 ascends the curb when the compared information exceeds a predetermined value based on the comparison result, and may generate a dithered reference current of the steering reaction force motor by dithering the reference current of the steering reaction force motor included in the steering column module 200.

Next, in operation S16, the method may control the operation of the steering reaction force motor by providing the dithered reference current of the steering reaction force motor to the steering reaction force motor so that a haptic response may be generated on the steering wheel 100.

Here, in operation S17, S18 and S19, the meaning of ";" in the drawings can be understood as lack of arrival of a steering wheel haptic response control according to the present embodiments.

Figure 17:
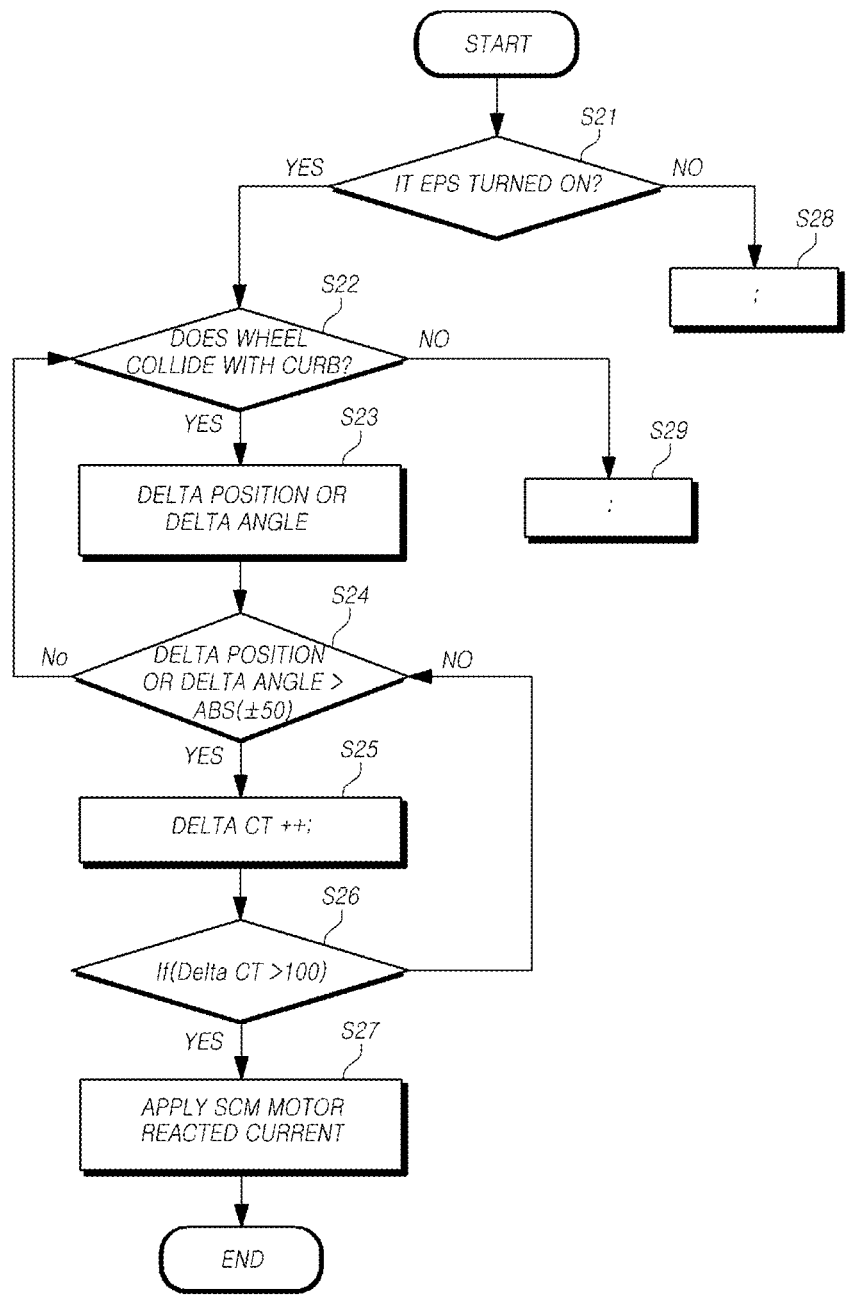
FIG. 17 shows a detailed diagram of a method of locking a steering wheel according to an embodiment of the present disclosure.

FIG. 17 shows a detailed diagram of a method of locking a steering wheel according to an embodiment of the present disclosure.

Referring to FIG. 17, in operation S21, the method may first determine whether an EPS is turned on. Next, in operation S22, when the EPS is turned on, whether at least one vehicle wheel 500 collides with the curb may be determined.

Next, in operation S23 to S26, when at least one vehicle wheel 500 collides with the curb, the method may determine whether at least one vehicle wheel 500 ascends the curb. Here, whether at least one vehicle wheel 500 ascends the curb may be determined by delta position information (i.e., a difference between absolute values of the rack position reference value and the actual rack position value) or delta angle information (i.e., a difference between absolute values of the steering angle value and the pinion angle value).

the method may compare the delta position information or the delta angle information, and may determine that at least one vehicle wheel 500 has collided or contacted with the curb when the compared information exceeds a predetermined first value based on the comparison result. Next, the method may compare the delta position information or the delta angle information for each specific time period (e.g., a control period—1 ms, or the like, delta CT++ as seen in the drawing) during a predetermined time (e.g., 100 ms, or the like, delta CT>100 as seen in the drawing), may determine that at least one vehicle wheel 500 ascends the curb when the compared information exceeds a predetermined second value (e.g., an absolute value of 50 as shown in the drawing), and may increase the reference current of the steering reaction force motor included in the steering column module 200 by the maximum current of the steering reaction force motor.

Next, in operation S27, the method may control the operation of the steering reaction force motor included in the steering column module 200 by providing the maximum current of the steering reaction force motor to the steering reaction force motor for a predetermined time so that the steering wheel 100 may be locked.

Here, in operation S28 and S29, the meaning of ";" in the drawings can be understood to mean lack of arrival of steering wheel locking control according to the present embodiments.

Figure 18:
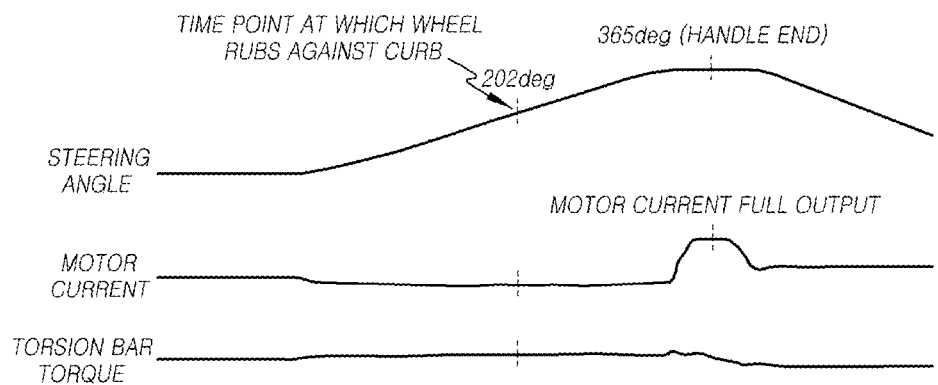
FIGS. 18 and 19 are waveform diagrams illustrating comparison between the state of operation of a conventional steering column module and the state of operation of a steering column module when a haptic response is generated on a steering wheel according to an embodiment of the present disclosure.
Figure 19:
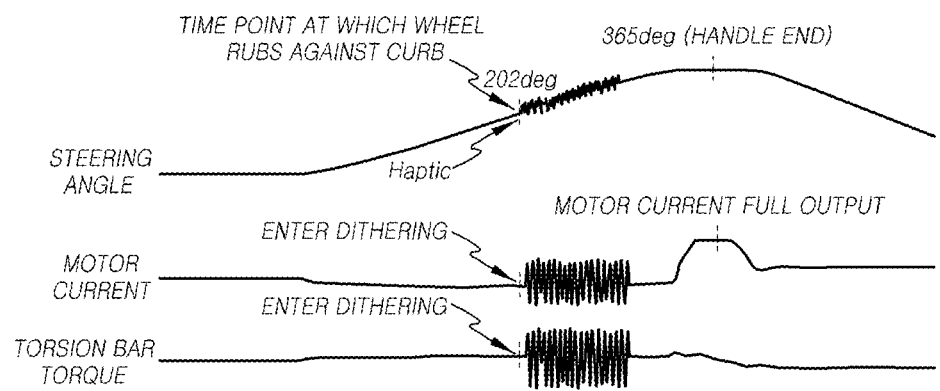

FIGS. 18 and 19 are waveform diagrams illustrating comparison between the state of operation of a conventional steering column module and the state of operation of a steering column module when a haptic response is generated on a steering wheel according to an embodiment of the present disclosure.

Referring to FIG. 18, in the conventional steering column module, the steering wheel may continue to move (rotate) up to 365 degrees without stopping at the moment when a vehicle wheel rubs against the curb (202 degrees on the basis of the steering angle).

Referring to FIG. 19, the steering column module 200 according to some embodiments of the present disclosure may provide the dithered reference current to the steering reaction force motor at the moment when at least one vehicle wheel 500 rubs against the curb (202 degrees on the basis of the steering angle). Accordingly, the steering wheel 100 may generate a haptic response, and thereby the driver may recognize (or determine) that the wheel has ascended the curb.

Figure 20:
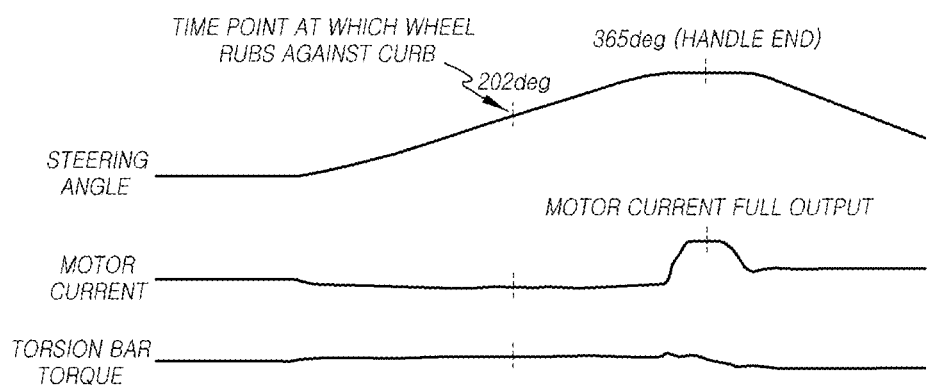
FIGS. 20 and 21 are waveform diagrams illustrating a comparison between the state of operation of a conventional steering column module and the state of operation of a steering column module when a steering wheel is locked according to an embodiment of the present disclosure.
Figure 21:
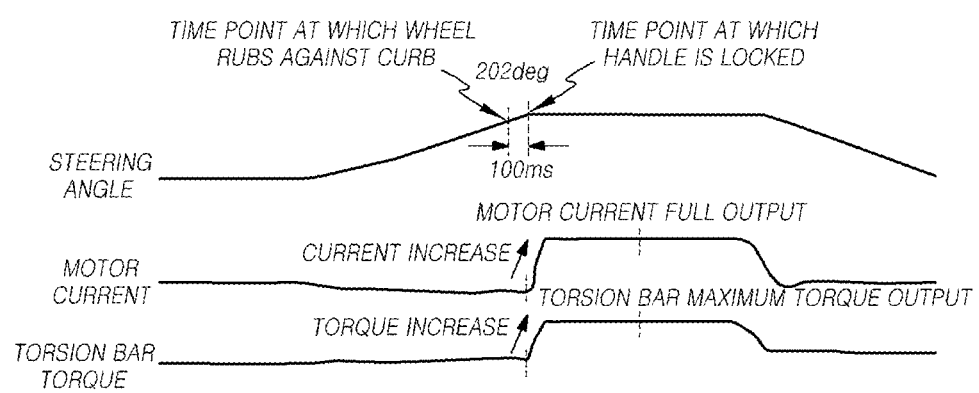

FIGS. 20 and 21 are waveform diagrams illustrating comparison between the state of operation of a conventional steering column module and the state of operation of a steering column module when a steering wheel is locked according to an embodiment of the present disclosure.

Referring to FIG. 20, in the conventional steering column module, the steering wheel may continue to move (rotate) up to 365 degrees without stopping at the moment when a vehicle wheel rubs against the curb (202 degrees on the basis of the steering angle).

Referring to FIG. 21, the steering column module 200 according to certain embodiments of the present disclosure may provide the maximum current to the steering reaction force motor at the moment when at least one vehicle wheel 500 rubs against the curb (202 degrees on the basis of the steering angle). Accordingly, since the steering wheel 100 is no longer moving, the driver may recognize (or determine) that at least one vehicle wheel 500 has ascended the curb. Particularly, there may be a condition determination time (100 ms delay) from the moment when the vehicle wheel 500 rubs against (or collides with) the curb to the state where the steering wheel 100 is locked.

Figure 22:
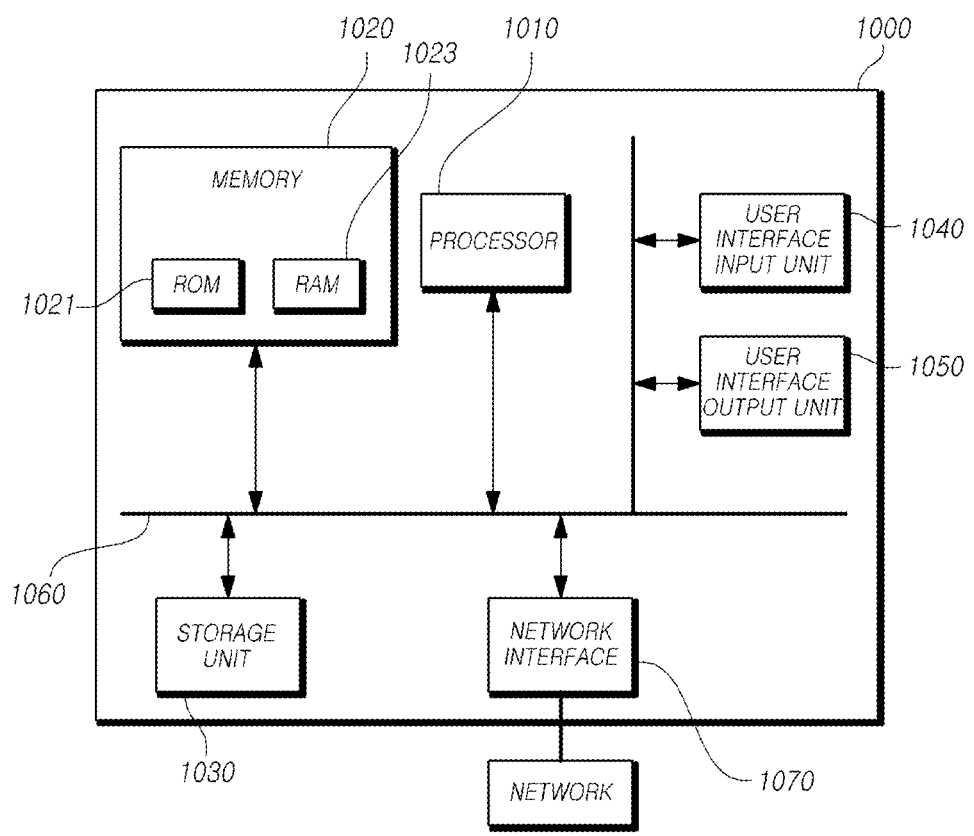
FIG. 22 shows a block diagram of a computer system of a steer-by-wire-based vehicle steering apparatus and vehicle steering control apparatus according to an embodiment of the present disclosure.

FIG. 22 is a block diagram illustrating a computer system of a steer-by-wire-based vehicle steering apparatus and vehicle steering control apparatus according to an embodiment of the present disclosure.

Referring to FIG. 22, the embodiments of the present disclosure described above may be implemented in a computer system including, for example, a non-transitory computer-readable recording medium. As shown in the drawings, a computer system 1000 such as the steer-by-wire-based vehicle steering apparatus and vehicle steering control apparatus may include at least one or more components selected from among one or more processors 1010, a memory 1020, a storage unit 1030, a user interface input unit 1040, and a user interface output unit 1050, and these components may communicate with each other via a bus 1060. In addition, the computer system 1000 may also include a network interface 1070 for connecting to a network. The processor 1010 may be a CPU or a semiconductor device that executes processing instructions stored in the memory 1020 and/or the storage unit 1030. The memory 1020 and the storage unit 1030 may include various types of volatile/nonvolatile storage media. For example, the memory may include ROM 1021 and RAM 1023.

Accordingly, the embodiments of the present disclosure may be implemented in a computer-implemented method or in a non-volatile computer recording medium with computer-executable instructions stored therein. The instructions, when executed by a processor, may perform a method according to at least one embodiment of the present disclosure.

Although the embodiments of the steer-by-wire-based vehicle steering control apparatus, vehicle steering apparatus, and vehicle steering method have been described above, the present embodiments are not limited thereto. The scope of the present disclosure should be interpreted by the claims attached hereto, and it should be interpreted that all technical spirits within the scope equivalent to the claims fall within the scope of the present disclosure.

What is claimed is:

1. An apparatus for controlling a steer-by-wire-based vehicle, comprising:
one or more processors; and
memory storing executable instructions that, if executed by the one or more processors, configure the one or more processors to:
acquire information associated with a state of operating a steering rack module, wherein the steering rack module is connected to at least one vehicle wheel and is mechanically separated from a steering column module connected to a steering wheel; and
determine a state of collision or contact of the at least one vehicle wheel with an external object based on the information associated with the state of operating the steering rack module and control a steering reaction force motor, comprised in the steering column module and providing steering reaction force to the steering wheel, according to the determined state of the collision or contact, wherein the one or more processors are configured to:

acquire information associated with a status of operating the steering column module, determine whether the at least one vehicle wheel ascends a curb based on at least one of the information associated with the status of operating the steering rack module and the information associated with the status of operating the steering column module, and control the steering reaction force motor.

2. The apparatus of claim 1, wherein the one or more processors are configured to determine whether the at least one vehicle wheel ascends a curb based on information on a position of a rack comprised in the information associated with the status of operating the steering rack module.

3. The apparatus of claim 1, wherein the one or more processors are configured to determine whether the at least one vehicle wheel ascends a curb based on information on driving current of a driving motor in the information associated with the status of operating the steering rack module.

4. The apparatus of claim 1, wherein the one or more processors are configured to:

acquire information associated with a status of operating the steering column module, and determine whether the at least one vehicle wheel ascends a curb based on steering angle of the steering wheel and angle of a pinion, wherein the steering angle of the steering wheel is comprised in the information associated with the status of operating the steering column module and the angle of the pinion is comprised in the information associated with the status of operating the steering rack module.

5. The apparatus of claim 1, wherein the one or more processors are configured to:

acquire information associated with a state of operating the steering column module, and determine whether the at least one vehicle wheel ascends a curb based on steering angle of the steering wheel and motor angle of a driving motor of the steering rack module, wherein the steering angle of the steering wheel is comprised in the information associated with the status of operating the steering column module and the motor angle of the driving motor is comprised in the information associated with the status of operating the steering rack module.

6. The apparatus of claim 1, wherein the one or more processors are configured to:

acquire information associated with a state of operating the steering column module, and inspect information associated with a steering angle sensor signal, a pinion angle sensor signal and a rack position sensor signal, wherein the information associated with the steering angle sensor signal is comprised in the information associated with the status of operating the steering column module and the information associated with the pinion angle sensor signal and the rack position sensor signal is comprised in the information associated with the status of operating the steering rack module, and determine whether the at least one vehicle wheel ascends a curb based on position information of a rack or based on steering angle information and angle information of a pinion according to the inspection result.

7. The apparatus of claim 1, wherein the one or more processors are configured to control the steering reaction force motor so that at least one of generation of a haptic response on the steering wheel and locking of the steering wheel is performed when the at least one vehicle wheel ascends the curb.

8. The apparatus of claim 1, wherein the one or more processors are configured to generate a dithered reference current of the steering reaction force motor by dithering a reference current of the steering reaction force motor, and control the steering reaction force motor by providing the dithered reference current to the steering reaction force motor for a predetermined time based on a time point at which the one or more processors determine that the at least one vehicle wheel ascends the curb so that a haptic response is generated on the steering wheel.

9. The apparatus of claim 1, wherein the one or more processors are configured to:

modulate a reference current of the steering reaction force motor and generate a modulated reference current of the steering reaction force motor, and control the steering reaction force motor by providing the modulated reference current to the steering reaction force motor for a predetermined time based on a time point at which the one or more processors determine that the at least one vehicle wheel ascends the curb so that a haptic response is generated on the steering wheel.

10. The apparatus of claim 1, wherein the one or more processors are configured to provide a maximum current of the steering reaction force motor to the steering reaction force motor for a predetermined time while increasing a reference current of the steering reaction force motor by the maximum current of the steering reaction force motor from a time point at which one or more processors determine that the at least one vehicle wheel ascends the curb so that the steering wheel is locked.

11. The apparatus of claim 1, wherein the one or more processors are configured to:

inspect information associated with a steering torque sensor signal, comprised in the information associated with the status of operating on the steering column module, estimate steering torque based on a steering angle of the steering wheel, comprised in the information associated with the status of operating the steering column module, and motor angle of the steering reaction force motor when the steering torque sensor signal information is abnormal, and control the steering reaction force motor.

12. The apparatus of claim 11, wherein the one or more processors are configured to control the steering reaction force motor so that at least one of generation of a haptic response on the steering wheel and locking of the steering wheel is performed based on the estimated steering torque.

13. A method for controlling a steer-by-wire-based vehicle, comprising:

acquiring information associated with a state of operating a steering rack module, wherein the steering rack module is connected to at least one vehicle wheel and is mechanically separated from a steering column module connected to a steering wheel;

determining a state of collision or contact of the at least one vehicle wheel with an external object based on the information associated with the status of operating the steering rack module; and controlling a steering reaction force motor, comprised in the steering column module and providing a steering reaction force to the steering wheel, according to the determined state of the collision or contact, wherein the controlling the steering reaction force motor comprises:

generating a dithered reference current of the steering reaction force motor by dithering a reference current of the steering reaction force motor when the at least one vehicle wheel ascends a curb, and providing the dithered reference current of the steering reaction force motor to the steering reaction force motor for a predetermined time based on a time point at which it is determined that the at least one vehicle wheel ascends the curb so that a haptic response is generated on the steering wheel.

14. The method of claim 13, wherein the controlling the steering reaction force motor comprises:

when the at least one vehicle wheel ascends the curb, increasing a reference current of the steering reaction force motor by a maximum current of the steering reaction force motor from a time point at which it is determined that the at least one vehicle wheel ascends the curb, and providing the maximum current of the steering reaction force motor to the steering reaction force motor for a predetermined time so that the steering wheel is locked.

15. An apparatus comprising:

a steering column module connected to a steering wheel;

a steering rack module connected to at least one vehicle wheel and mechanically separated from the steering column module; and a controller configured to acquire information associated with a status of operating the steering rack module, to determine a state of collision or contact of the at least one vehicle wheel with an external object based on the information associated with the status of operating the steering rack module, and to control a steering reaction force motor, comprised in the steering column module and providing steering reaction force to the steering wheel, according to the determined status of the collision or contact, wherein the one or more processors are configured to:

acquire information associated with a status of operating the steering column module, determine whether the at least one vehicle wheel ascends a curb based on at least one of the information associated with the status of operating the steering rack module and the information associated with the status of operating the steering column module, and control the steering reaction force motor.

\* \* \* \* \*